US011993981B2

(12) United States Patent
Ruotsalainen et al.

(10) Patent No.: US 11,993,981 B2
(45) Date of Patent: May 28, 2024

(54) DEVICE FOR CONTROLLING VISIBILITY

(71) Applicant: Teknologian tutkimuskeskus VTT Oy, Espoo (FI)

(72) Inventors: Teemu Ruotsalainen, Espoo (FI); Tapio Mäkelä, Espoo (FI); Asko Sneck, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 18/033,840

(22) PCT Filed: Oct. 26, 2021

(86) PCT No.: PCT/FI2021/050716
§ 371 (c)(1),
(2) Date: Apr. 26, 2023

(87) PCT Pub. No.: WO2022/090619
PCT Pub. Date: May 5, 2022

(65) Prior Publication Data
US 2023/0349226 A1    Nov. 2, 2023

(30) Foreign Application Priority Data
Oct. 26, 2020    (FI) ..................................... 20206054

(51) Int. Cl.
*E06B 9/24* (2006.01)
*F21V 8/00* (2006.01)
(Continued)

(52) U.S. Cl.
CPC ............ *E06B 9/24* (2013.01); *F21V 23/0464* (2013.01); *G02B 6/0038* (2013.01); *G02B 6/006* (2013.01);
(Continued)

(58) Field of Classification Search
CPC .. G02B 6/0043; G02B 6/0016; G02B 6/0038; G02B 6/006; G02F 1/1323
See application file for complete search history.

(56) References Cited

U.S. PATENT DOCUMENTS 6,729,736 B2    5/2004  Umemoto
11,397,293 B1*  7/2022  Masschelein ........ G02B 6/0065
(Continued)

FOREIGN PATENT DOCUMENTS

CN    109343169 A  *  2/2019  ........... G02B 6/0043
EP       2009615 A1     12/2008
(Continued)

OTHER PUBLICATIONS

European Patent Office, International Search Report, Application No. PCT/FI2021/050716, dated Feb. 9, 2022, 3 pages.
(Continued)

*Primary Examiner* — Fatima N Farokhrooz
(74) *Attorney, Agent, or Firm* — Ziegler IP Law Group

(57) ABSTRACT

A visibility control device includes
one or more light sources to provide input light,
a waveguiding substrate, which has a first major surface and a second major surface, and
a plurality of light-deflecting grooves implemented on at least one major surface of the substrate.
The device is arranged to form guided light by coupling the input light into the substrate,
The grooves are arranged to form deflected light by coupling the guided light out of the substrate through the second major surface of the substrate.

18 Claims, 23 Drawing Sheets

(51) Int. Cl.
*F21V 23/04* (2006.01)
*G06F 21/84* (2013.01)

(52) U.S. Cl.
CPC ........ *G06F 21/84* (2013.01); *E06B 2009/247* (2013.01)

(56) References Cited

U.S. PATENT DOCUMENTS

| | | | |
|---|---|---|---|
| 2008/0196607 | A1 | 8/2008 | Rinko |
| 2010/0177533 | A1* | 7/2010 | Griffiths ............... G02B 6/0068 362/605 |
| 2014/0268757 | A1 | 9/2014 | Vissenberg et al. |
| 2017/0052289 | A1* | 2/2017 | Boissevain ............ H05B 47/11 |
| 2017/0336661 | A1* | 11/2017 | Harrold ................ G02B 6/0055 |
| 2020/0033532 | A1 | 1/2020 | Coleman et al. |
| 2020/0166754 | A1* | 5/2020 | Leister ................ G02B 5/3083 |
| 2020/0319391 | A1* | 10/2020 | Vasylyev ................ G02B 6/005 |
| 2022/0260771 | A1* | 8/2022 | Liao ..................... G02B 6/0038 |

FOREIGN PATENT DOCUMENTS

| | | |
|---|---|---|
| JP | 2000230373 A | 8/2000 |
| JP | 2011228089 A | 11/2011 |
| JP | 2012515416 A | 7/2012 |
| JP | 2013218873 A | 10/2013 |
| JP | 2014107167 A | 6/2014 |
| JP | 2014146551 A | 8/2014 |
| JP | 2017509115 A | 3/2017 |
| WO | 2007123202 A1 | 9/2009 |
| WO | 2010082952 A1 | 7/2010 |
| WO | 2013153837 A1 | 10/2013 |
| WO | 2014137754 A2 | 9/2014 |
| WO | 2015121352 A1 | 8/2015 |
| WO | 2019090139 A1 | 5/2019 |
| WO | 2019102959 A1 | 5/2019 |

OTHER PUBLICATIONS

Finish Patent and Registration Office, Office Action, U.S. Appl. No. 20/206,054, dated Jan. 25, 2021, 12 pages.
Finnish Patent and Registration Office, Office Action, U.S. Appl. No. 20/206,054, dated Jun. 23, 2021, 8 pages.
Liu et al. "Roll-to-roll UV embossing process applied for light bar-based sub-wavelength gratings for backlight" Journal of the Society for Information Display, 2013, vol. 20, DOI: 10.1002/jsid. 131, 7 pages.
Bruck et al. "Flexible thin-film polymer waveguides fabricated in an industrial roll-to-roll process" Applied Optics 2013, vol. 52, Published Jun. 2013, 6 pages.
Makela et al, "Roll-to-roll printed gratings in cellulose acetate web using novel nanimprinting device" Microelectronic Engineering 2011, vol. 88, Available online Feb. 15, 2011, doi: 10.1016/j.mee. 2011.02.016, 3 pages.
European Patent Office, International Preliminary Report on Patentability, Application No. PCT/FI2021/050716, completed Nov. 18, 2022, 18 pages.
European Patent Office, Written Opinion of the International Searching Authority, Application No. PCT/FI2021/050716, dated Feb. 9, 2022, 10 pages.
Japanese Patent Office, Notice of Reasons for Rejection, Application No. 2023-525115, dated Oct. 10, 2023, 4 pages.
Japan Patent Office, Office Action, Application No. 2023525115, mailed Feb. 6, 2024, 4 pages.

* cited by examiner

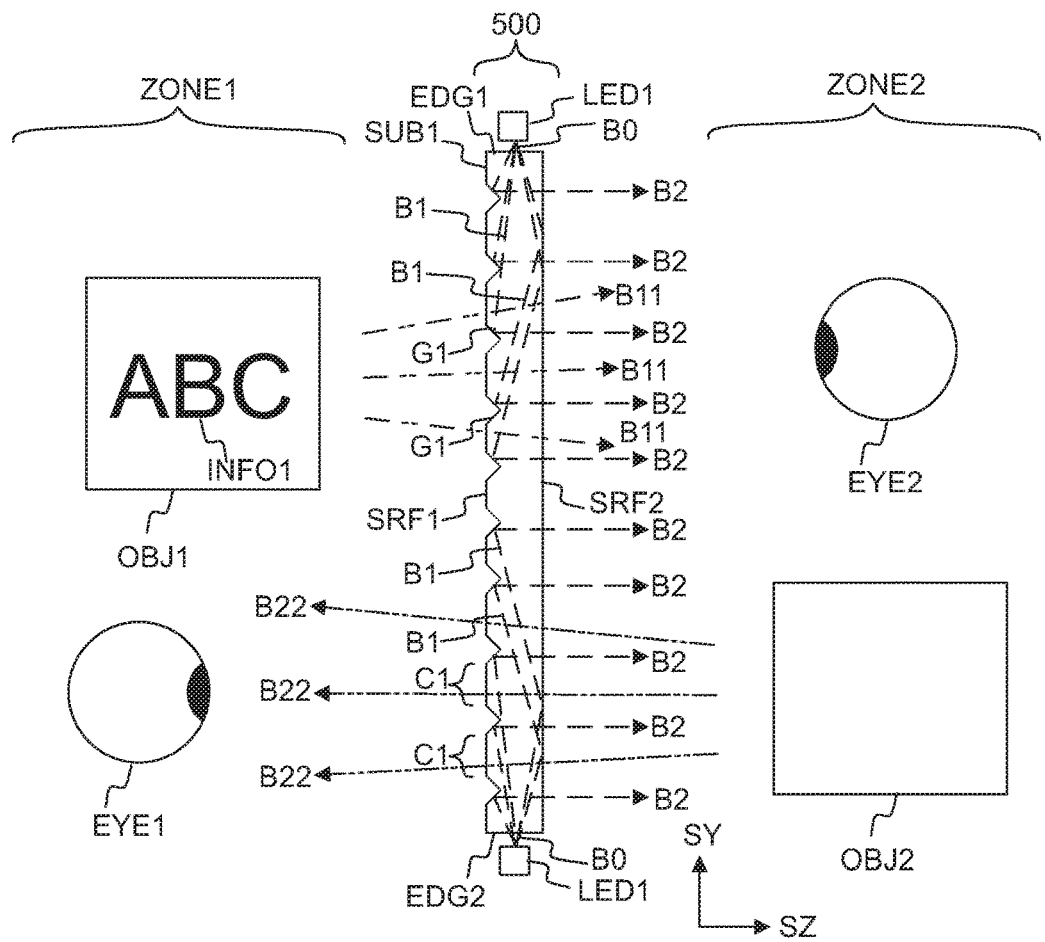
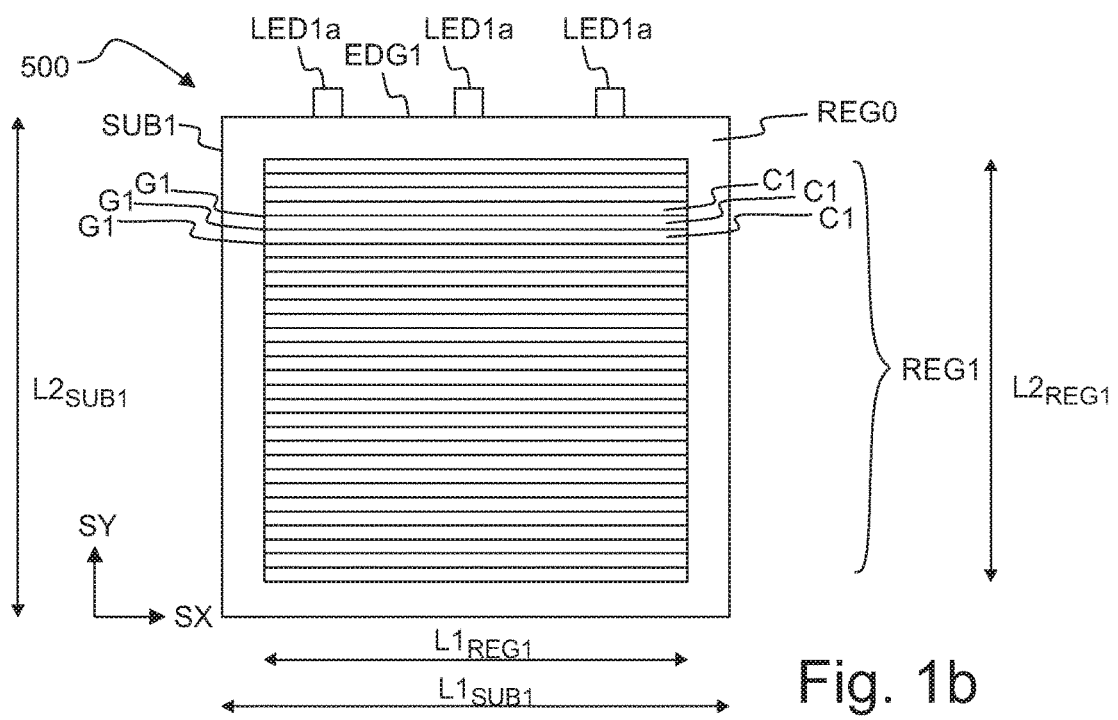
Fig. 1a
Fig. 1b

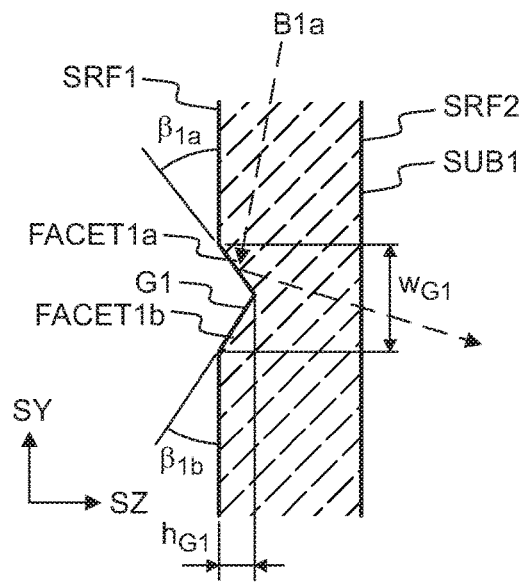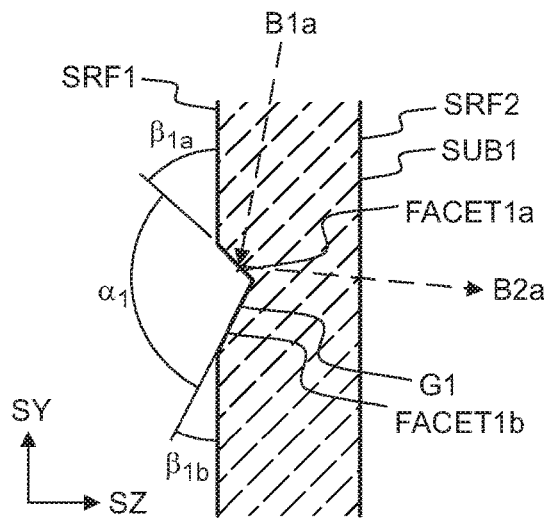
Fig. 10a  Fig. 10b
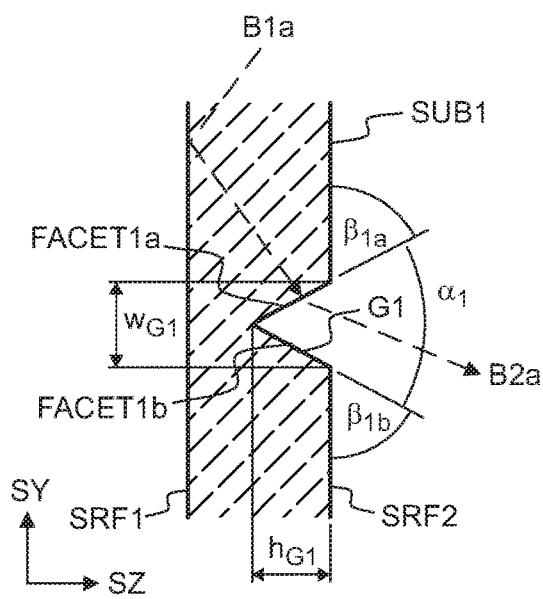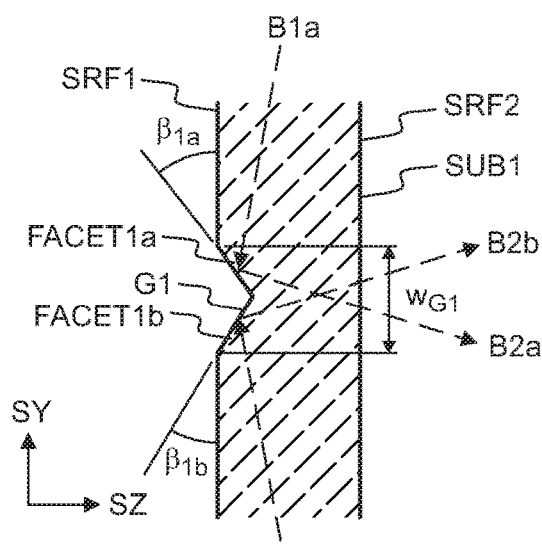
Fig. 10c  Fig. 10d

DEVICE FOR CONTROLLING VISIBILITY

FIELD

The present invention relates to controlling visibility.

BACKGROUND

A first observer located inside of a building may look through a window in order to see an object, which is located outside. On the other hand, a second observer located outside may see another object, which is located inside, by looking through the same window. In particular, the second observer located outside may also see the first observer by looking through the window.

Observing the interior from the outside through the window may sometimes violate privacy.

It is known that a window may comprise e.g. an optically diffusing layer in order to make it difficult or impossible for the second observer to discern optical features of the object, which is located inside the building.

SUMMARY

Some variations relate to a visibility control device. Some variations relate to a method for controlling visibility. Some variations relate to a method for producing a visibility control device.

According to an aspect, there is provided a device of claim 1.

Further embodiments are defined in the other claims.

The scope of protection sought for various embodiments of the invention is set out by the independent claims. The embodiments, if any, described in this specification that do not fall under the scope of the independent claims are to be interpreted as examples useful for understanding various embodiments of the invention.

The visibility control device (500) comprises:
one or more light sources (LED1) to provide input light (B0),
a waveguiding substrate (SUB1), which has a first major surface (SRF1) and a second major surface (SRF2),
a plurality of light-deflecting grooves (G1) implemented on at least one major surface (SRF1, SRF2) of the substrate (SUB1),
wherein the device (500) is arranged to form guided light (B1) by coupling the input light (B0) into the substrate (SUB1),
wherein the grooves (G1) are arranged to form deflected light (B2) by coupling the guided light (B1) out of the substrate (SUB1) through the second major surface (SRF2) of the substrate (SUB1).

The substrate of the visibility control device may appear as a bright luminous area to an observer, who is located outside the building. The visual brightness of the substrate may be so high that it may prevent the outsider from observing the optical features of an object, which is located inside. The deflected light may cause a dazzling effect to an observer, who is located outside.

The visibility control device may provide controllable one-way visibility. One-way visibility is useful in many applications, for example as a window for providing privacy.

The visibility control device may be arranged to protect e.g. the privacy of the interior of a building or a vehicle. The visibility control device may have one or more functionalities to make it difficult or impossible for an outsider to detect the light, which originates from the interior of the building.

The visibility control device may have one or more functionalities to prevent an outsider from perceiving the light, which originates from the interior of the building.

The perception of one-way transmission may be achieved when one side of the visibility control device provides dazzling light, which effectively prevents an outsider from viewing from the outside to the inside, wherein the device may at the same time allow a person located inside to view from the inside to the outside. This feature may provide privacy in a building or in a vehicle without preventing the person located inside the building to view objects, which are located outside. The visibility control device may provide a clear view in a first direction, while hindering visibility in the second opposite direction.

The waveguiding substrate may comprise a plurality of microscopic light-deflecting grooves to project deflected light towards an outside region. The light-deflecting grooves of the waveguiding substrate may be so narrow, and the distance between adjacent light-deflecting grooves may be so small that it may be difficult or impossible to discern an individual groove from the adjacent grooves by viewing the surface of the substrate with unaided naked eye. Consequently, the waveguiding substrate may appear as a visually clear window to the person located inside. The maximum distance between adjacent light-deflecting grooves may be e.g. smaller than 0.6 mm. The width of the grooves may be e.g. smaller than 10 µm. Optical attenuation caused by the grooves may be e.g. smaller than 10%. Optical transmittance of the substrate may be higher than 80%, respectively.

The light-deflecting grooves may provide deflected light primarily towards an outside region. The intensity of the deflected light projected to the outside region may be e.g. arranged to be greater than the intensity of light, which escapes from the substrate to the inside region.

The substrate may appear as a substantially uniform weakly luminous area to a first observer, who is located inside a building. The visual brightness of the substrate, when observed by the first observer, may be so low that it allows clear unobstructed view from the inside to the outside. On the other hand, the substrate may appear as a bright luminous area to a second observer, who is located outside the building.

The visual brightness of the substrate may be so high that it may prevent the second observer from perceiving the optical features of an object, which is located inside. The deflected light may cause a dazzling effect to an observer, who is located in the outside region. The visibility control device may be used e.g. as a privacy screen.

BRIEF DESCRIPTION OF THE DRAWINGS

In the following examples, several variations will be described in more detail with reference to the appended drawings, in which FIG. 1a shows, by way of example, in a cross-sectional side view, a first object located on a first side of a directional window panel, and a second object located on a second side of the directional window panel, FIG. 1b shows, by way of example, in a front view, grooves and clear areas of a waveguiding substrate, FIG. 10a shows, by way of example, in a cross-sectional side view, a light-deflecting groove, FIG. 10b shows, by way of example, in a cross-sectional side view, a light-deflecting asymmetric groove, FIG. 10c shows, by way of example, in a cross-sectional side view, a light-deflecting groove, which comprises refractive facets, FIG. 10d shows, by way of example, in a cross-sectional side view, using a first facet to couple first guided light out of the substrate, and using a second facet to couple second guided light out of the substrate.

DETAILED DESCRIPTION

Figure 2A:
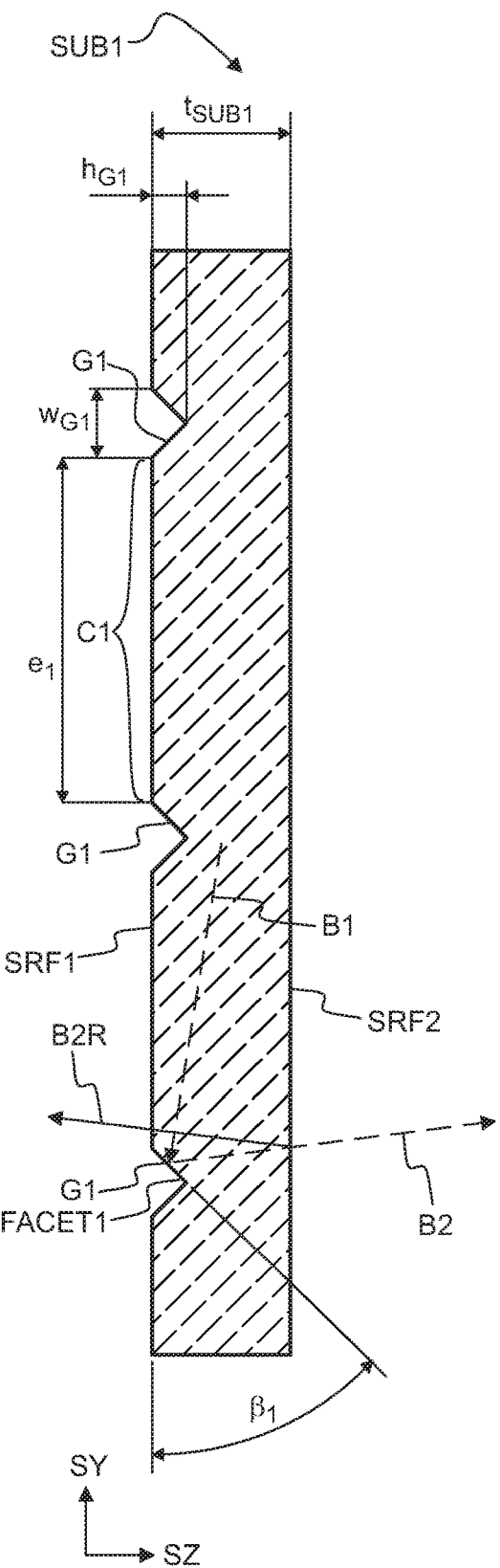
FIG. 2a shows, by way of example, in a cross-sectional side view, light-deflecting grooves of the substrate.

Referring to FIG. 1a, the visibility control device 500 may comprise one or more light sources LED1 to provide light, a waveguiding substrate SUB1 to guide light, and a plurality of microscopic light-deflecting grooves G1 to couple light out of the substrate. The light sources LED1 may provide emitted light B0. The emitted light B0 may be used as input light B0 for the substrate SUB1. The emitted light B0 may be coupled into the substrate SUB1 so as to form waveguided light B1. The waveguided light B1 may propagate within the substrate SUB1. The waveguided light B1 may be confined to the substrate SUB1 by total internal reflection (TIR).

The substrate SUB1 may be a planar waveguide. The waveguiding substrate SUB1 may comprise a first major surface SRF1 and a second major surface SRF2. The light-deflecting grooves G1 may be implemented on the first major surface SRF1 and/or the second major surface SRF2 The substrate SUB1 may be a flat planar waveguide or a curved planar waveguide. The major surfaces SRF1, SRF2 of a flat planar waveguide SUB1 may be planes. The substrate SUB1 may be a flat planar waveguide, which has constant thickness. The flat planar waveguide having the constant thickness may be easy to produce.

SX, SY, and SZ may denote orthogonal directions. The major surfaces SRF1, SRF2 may be parallel with a plane defined by the directions SX, SY. The direction SZ may be perpendicular to the major surfaces SRF1, SRF2 of the substrate SUB1.

The flat planar waveguide may also have tapered thickness. The tapered thickness means that the flat planar waveguide has a first thickness at a first edge and a second different thickness at a second edge. The tapered thickness may be used e.g. in order to equalize spatial intensity distribution of deflected light B2. The device 500 may be arranged to operate such that the intensity $I_{B2}(x,y)$ of the deflected light is substantially independent of the transverse position (x,y).

The substrate SUB1 may be a curved planar waveguide. The major surfaces SRF1, SRF2 of a curved planar waveguide SUB1 may be singly curved, i.e. they may be e.g. cylindrical surfaces or conical surfaces. The major surfaces SRF1, SRF2 of a curved planar waveguide SUB1 may be doubly curved, i.e. they may be e.g. spherical surfaces or ellipsoidal surfaces.

The visibility control device 500 may have a first viewing region ZONE1 at a first side of the device 500, and a second viewing region ZONE2 at a second side of the device 500.

Waveguided light B1 propagating within the substrate SUB1 is trapped within the substrate SUB1 by total internal reflection (TIR) until the guided light B1 encounters a light-deflecting groove G1. When the guided light B1 encounters a groove G1, a part of the guided light B1 may be deflected by the groove G1 so that the guided light B1 is coupled out of the substrate SUB1 through the second major surface SRF2. The grooves G1 may project deflected light B2 by coupling the guided light B1 out of the substrate SUB1. The deflected light B2 may make the first major surface SRF1 appear bright to the second viewing region ZONE2.

The light-deflecting grooves G1 may be arranged to form a deflected light beam B2 by reflecting, refracting and/or scattering the waveguided light B1. The light-deflecting grooves G1 may direct the deflected light beam B2 to the second viewing region ZONE2 for obstructing the vision of an observer EYE2 located in said second viewing region ZONE2.

The first viewing region ZONE1 may be e.g. inside a building, and the second viewing region ZONE2 may be outside the building. The first viewing region ZONE1 may be e.g. inside a vehicle, and the second viewing region ZONE2 may be outside the vehicle. The first viewing region ZONE1 may be e.g. inside a room, and the second viewing region ZONE2 may be outside the room. The first viewing region ZONE1 may be e.g. inside a cabinet, and the second viewing region ZONE2 may be outside the cabinet.

The first major surface SRF1 may be used e.g. as an inner surface of a window panel, and the second major surface SRF2 may be used as an outer surface of the window panel. The first major surface SRF1 may also be called e.g. as a back surface, and the second major surface SRF2 may also be called e.g. as a front surface.

The visibility control device 500 may be arranged to provide one-directional visibility through the substrate SUB1 of the visibility control device 500. The visibility control device 500 may be called e.g. as a directional window. The visibility control device 500 may be arranged to operate such that a first observer (EYE1) located within the first viewing region ZONE1 may easily see an object OBJ2 located within the second viewing region ZONE2, wherein a second observer (EYE2) located within the second viewing region ZONE2 cannot accurately see a first object OBJ1 located within the first viewing region ZONE1.

The visibility control device 500 may be arranged to provide deflected light B2 towards the second observer. The at least a part of the deflected light B2 may propagate e.g. in a direction SZ, which is perpendicular to the plane of the substrate SUB1.

The deflected light B2 may cause a dazzling effect. The visibility control device 500 may be arranged to provide dazzling deflected light B2 to the second viewing region ZONE2 so as to make it more difficult or impossible for the second observer EYE2 to discern optical features of the first object OBJ1. The deflected light B2 may reduce the visual contrast so that observing the optical features of the first object OBJ1 becomes difficult or impossible.

The visibility control device 500 may be arranged to provide the dazzling deflected light B2 such that the intensity of the dazzling deflected light B2 (at a position of the eye of the observer EYE2) is greater than the intensity of light B11 received from the first object OBJ1 (at the position of the eye of the observer EYE2).

The first viewing region ZONE1 may be e.g. inside a meeting room, and the second viewing region ZONE2 may be outside the meeting room. The first object OBJ1 may be e.g. a display or a projection screen, which is arranged to display confidential information INFO1. For example, the information INFO1 may be displayed as an image, photo, video and/or text. The displayed information INFO1 may be e.g. one or more images, photo, video and/or text. The displayed information INFO1 may be e.g. a graphical image. The visibility control device 500 may effectively prevent observing the confidential information INFO1 by viewing from the second viewing region ZONE2. The deflected light B2 may reduce the visual contrast so that the observing of the displayed information INFO1 becomes difficult or impossible. At the same time, the visibility control device 500 may allow the observer (EYE1) located in the first viewing region ZONE1 to see the second object OBJ2 through the device 500.

The visibility control device 500 may comprise a plurality of clear viewing portions C1 so that the first observer (EYE1) located in the first viewing region ZONE1 may easily discern optical features of the second object OBJ2 located in the second viewing region ZONE2. The first observer (EYE1) may receive light B22 from the second object OBJ2 through the clear viewing portions C1 of the substrate SUB1. The clear viewing portions C1 may allow unobstructed viewing of the second object OBJ2 through the visibility control device 500. The clear viewing portions C1 may provide an unobstructed optical path from the object OBJ2 to the eye of the first observer EYE1. The clear viewing portions C1 may provide an unobstructed optical path from the second viewing region ZONE2 to the first viewing region ZONE1.

The waveguided light B1 may be confined to the substrate SUB1 by total internal reflection, which takes place at the major surfaces SRF1, SRF2 of the substrate SUB1. The waveguided light B1 may also be called simply as guided light B1. The waveguiding substrate operates as a light guide. The waveguided light B1 may propagate within the substrate SUB1 in one or more transverse directions (e.g. in the direction SY and/or −SY).

The first object OBJ1 may be e.g. the first observer EYE1. The second object OBJ2 may be e.g. the second observer EYE2.

The major surfaces SRF1, SRF2 may be at least locally parallel with each other (e.g. at an arbitrary transverse position (x,y)). A coordinate x may denote a position in the direction SX. A coordinate y may denote a position in the direction SY. The major surfaces SRF1, SRF2 may be at least locally parallel with each other so as to provide clear undistorted view through the substrate SUB1.

Referring to FIG. 1b, the substrate SUB1 may comprise an out-coupling region REG1, which comprises a plurality of grooves G1 to couple guided light B1 out of the substrate SUB1. The out-coupling region REG1 may be patterned with the grooves G1. The entire area of the substrate SUB1 does not need to be patterned with the grooves G1. The area of the out-coupling region REG1 may be smaller than or equal to the area of the major surface SRF1, SRF2. The dimension $L1_{REG1}$ of the out-coupling region REG1 in the direction SX may be equal to or smaller than the corresponding dimension $L1_{SUB1}$ of the substrate SUB1, and/or the dimension $L2_{REG1}$ of the out-coupling region REG1 in the direction SY may be equal to or smaller than the corresponding dimension $L2_{SUB1}$ of the substrate SUB1. The substrate SUB1 may comprise an outer region REG0, which is not arranged to couple light out of the substrate. The outer region REG0 may also be implemented so that the outer region REG0 does not comprise grooves. The outer region REG0 may be optionally covered e.g. with a frame (FIG. 9c) and/or with an opaque covering layer.

Referring to FIG. 2a, a plurality of light-deflecting grooves G1 may be implemented on a major surface SRF1 or SRF2 of the substrate SUB1. A light-deflecting groove G1 may have a width $w_{G1}$ and a depth $h_{G1}$. The cross-section of a light-deflecting groove G1 may have a width $w_{G1}$ and a depth $h_{G1}$.

The groove G1 may have one or more light-scattering facets FACET1. The angle $\beta_1$ may denote an orientation angle between the facet FACET1 and the major surface SRF1. The orientation angle $\beta_1$ of a facet is equal to the angle between surface normal of the facet and the surface normal of substrate SUB1.

The angle $\beta_1$ may be e.g. substantially equal to 45° to maximize intensity of the dazzling light B2 in the direction (SZ), which is perpendicular to the major surface SRF1 of the substrate SUB1. As a further criterion, the angle $\beta_1$ may be selected to provide total internal reflection (TIR) for the guided light B1 at the facet FACET1. The facet FACET1 may operate e.g. as a gas-solid interface, which provides total internal reflection of the guided light B1. In particular, the facet FACET1 may be implemented without depositing a reflective metallic coating on the facet FACET1.

The visibility control device 500 may also provide a small amount of escaping light B2R, which propagates to the first viewing region ZONE1 (e.g. in the direction −SZ). The escaping light B2R may be formed e.g. when a fraction of the dazzling light B2 is reflected from one or more surfaces of the visibility control device 500. The light-deflecting grooves G1 may deflect a major fraction of the guided light G1 towards the second viewing region ZONE2, wherein the light-deflecting grooves G1 may deflect a minor fraction of the guided light G1 towards the first viewing region ZONE1. The visibility control device 500 may be arranged to operate such that the intensity of the escaping light B2R propagating in the reverse direction −SZ is e.g. smaller than 20% of the intensity of the deflected light B2 propagating in the direction +SZ.

Figure 6A:
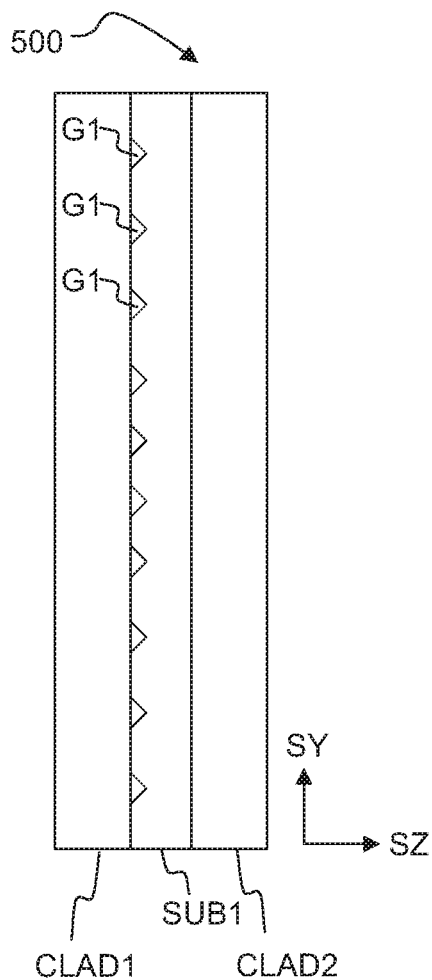
FIG. 6a shows, by way of example, in a cross-sectional side view, a visibility control device, which comprises one or more cladding layers to provide total internal reflection.
Figure 6B:
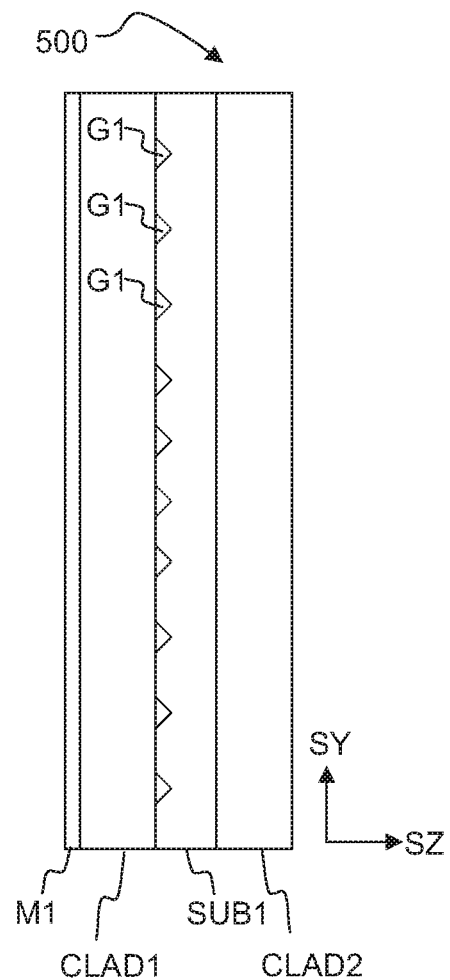
FIG. 6b shows, by way of example, in a cross-sectional side view, a visibility control device, which comprises a reflective layer to reduce back-scattering intensity.
Figure 7:
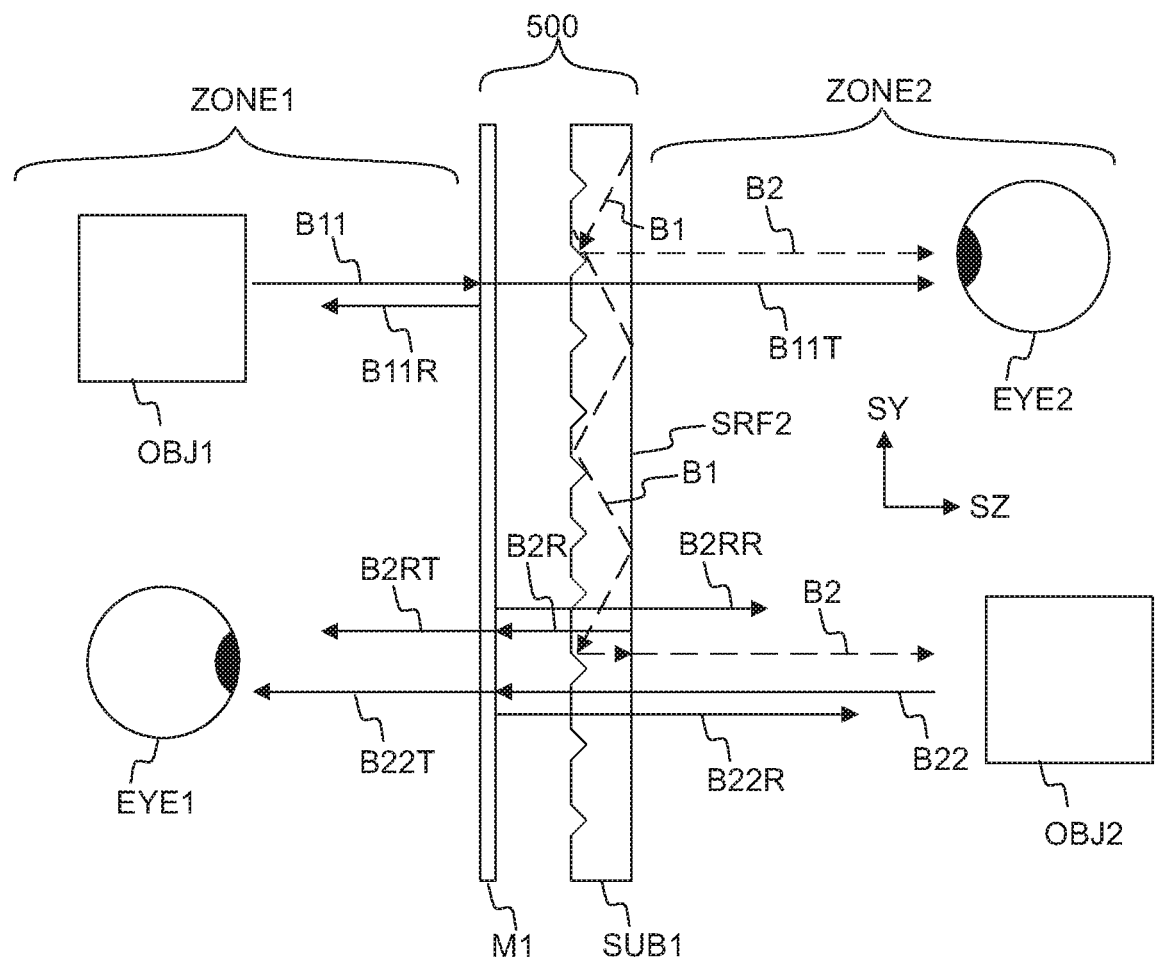
FIG. 7 shows, by way of example, in a cross-sectional side view, propagation of light beams through the reflective layer.
Figure 9A:
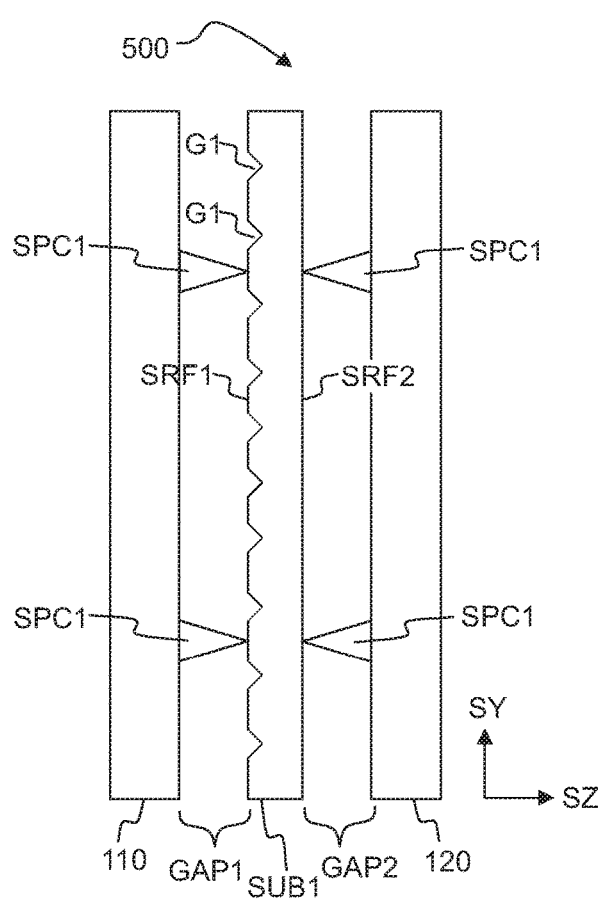
FIG. 9a shows, by way of example, in a cross-sectional side view, a visibility control device, which comprises a plurality of spacer elements to maintain an air gap.
Figure 9B:
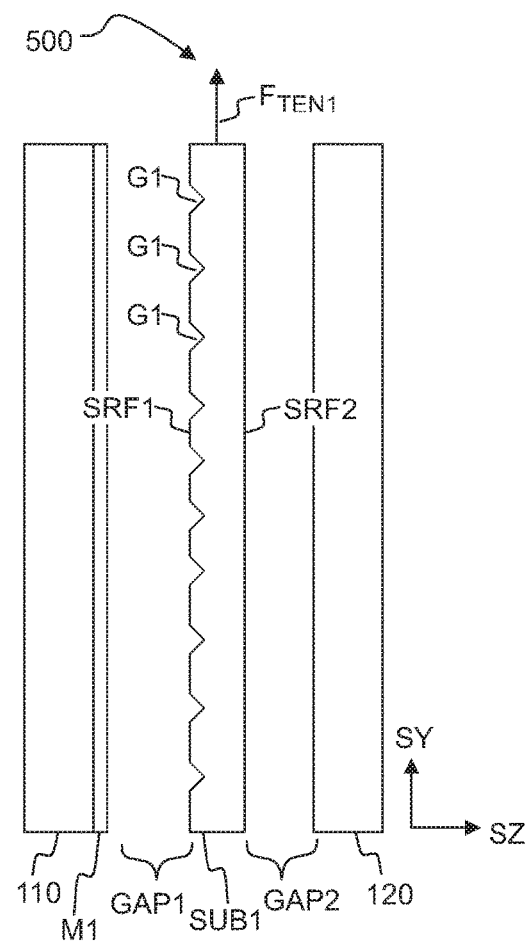
FIG. 9b shows, by way of example, in a cross-sectional side view, maintaining a flat shape of the substrate by tension forces.

In an embodiment, the visibility control device 500 may further comprise a semi-transparent mirror layer (M1) to further reduce the intensity of the escaping light B2R (FIG. 6b, FIG. 7, FIG. 9b). The visibility control device 500 may be arranged to operate such that the intensity of the escaping light B2R propagating in the reverse direction −SZ is e.g. smaller than 5% of the intensity of the deflected light B2 propagating in the direction +SZ.

In principle, the escaping light B2R could allow the observer (EYE1) located in the first viewing region ZONE1 to detect individual light-deflecting grooves G1. However, the light-deflecting grooves G1 may be so narrow and the light-deflecting grooves G1 may be so close to each other that that it may be difficult or impossible to discern an individual light deflecting groove G1 by an unaided naked human eye.

A distance between a person (EYE1) located indoors and the substrate SUB1 may typically be e.g. greater than 1 m. The angular resolution of a human eye is typically substantially equal to 0.02°. Consequently, it may be difficult for the unaided naked human eye (EYE1) to discern an individual groove G1 from the neighboring grooves G1 in a situation where the distance $e_1$ between the adjacent grooves G1 is smaller than 0.6 mm.

Furthermore, the eye of the observer EYE1 naturally focuses to an object OBJ2, rather than focusing to the narrow weakly discernible grooves G1 of the substrate SUB1. The human eye tends to automatically focus to an object (OBJ2) or to a displayed information (INFO1) behind the substrate SUB1, instead of focusing to the narrow grooves G1. The distance between the object OBJ2 and the observer EYE1 is greater than the distance between the grooves G1 and the observer EYE1. Consequently, the narrow grooves G1 of the substrate SUB1 may typically be out of focus of the eye of the human observer (EYE1). Said defocusing of the eye may make it difficult or impossible to visually discern the individual grooves G1 from the neighboring grooves G1 when the widths of the grooves are e.g. smaller than 10 μm and when the distances $e_1$ between the adjacent grooves G1 are e.g. smaller than 0.6 mm.

The widths of the grooves G1 may be e.g. in the range of 0.2 μm to 10 μm, advantageously in the range of 1 μm to 7 μm, and preferably in the range of 2 μm to 5 μm.

The grooves G1 may be so narrow and the grooves G1 may be so close to each other that the grooves G1 do not significantly obstruct the clear vision of the person (EYE1) located indoors.

The adjacent grooves G1 may together appear to the first observer (EYE1) as a substantially uniform weakly luminous region.

The total area covered by the light-deflecting grooves G1 may be small when compared with the total area of the clear viewing portions (C1) of the substrate SUB1, so as to provide substantially unobstructed view through the substrate SUB1. The total area covered by the light-deflecting grooves G1 may be e.g. smaller than 5% of the area of the first major surface SRF1 of the substrate SUB1.

The distance between the adjacent grooves G1 of the substrate SUB1 may be e.g. smaller than 0.6 mm, so as to make it difficult or impossible to discern the individual grooves G1. The average distance $e_1$ between adjacent grooves G1 may be smaller than 0.6 mm, preferably smaller than 0.4 mm. The average number density of the grooves G1 may be e.g. in the range of 1.6 grooves per mm to 20 grooves per mm.

For example, the substrate SUB1 may comprise a plurality of light-deflecting grooves G1 such that the width $w_{G1}$ of the grooves G1 is e.g. in the range of 1 μm to 10 μm, and the depth $h_{G1}$ of the grooves G1 may be in the range of 0.5 μm to 5 μm. The average distance $e_1$ between adjacent grooves G1 may be e.g. smaller than 0.6 mm. The total area covered by the grooves G1 may be e.g. smaller than 5% of the area of the first major surface SRF1 of the substrate SUB1.

The substrate SUB1 may comprise one or more out-coupling regions REG1 (FIG. 1b). A plurality of grooves G1 may be implemented on the major surface SRF1 and/or SRF2. The area of the coupling region REG1 may be smaller than or equal to the area of the major surface SRF1, SRF2. The out-coupling region REG1 may define a spatial area, which comprises a plurality of grooves G1 implemented on the major surface SRF1 and/or SRF2.

For example, an out-coupling region REG1 of the substrate SUB1 may comprise a plurality of light-deflecting grooves G1 such that the width $w_{G1}$ of the grooves G1 is e.g. in the range of 1 μm to 10 μm, and the depth $h_{G1}$ of the grooves G1 may be in the range of 0.5 μm to 5 μm. The average distance $e_1$ between adjacent grooves G1 may be e.g. smaller than 0.6 mm. The total area covered by the grooves G1 of the out-coupling region REG1 may be e.g. smaller than 5% of the area of the out-coupling region REG1. The average number density of the grooves G1 in the out-coupling region REG1 may be e.g. in the range of 1.6 grooves per mm to 20 grooves per mm. The dimensions $L1_{REG1}$ and $L2_{REG1}$ of the region REG1 may be e.g. greater than 5 cm. The size of the region REG1 may be e.g. greater than 5 cm×5 cm.

The grooves G1 may together cover a fraction $F_{G1}$ of the area of the out-coupling region REG1. The fraction $F_{G1}$ may be defined by the equation $F_{G1}=A_{G1}/A_{REG1}$, where $A_{G1}$ denotes the total area covered by the grooves G1 within the out-coupling region REG1, and $A_{REG1}$ denotes the area of the out-coupling region REG1. The fraction $F_{G1}$ may also be called as the coverage ratio of the grooves G1. The area $A_{C1}$ covered by the flat smooth regions C1 within the out-coupling region REG1 is equal to $A_{REG1}-A_{G1}$. The flat smooth regions C1 may together cover a fraction $F_{C1}$ of the out-coupling region REG1. The fraction $F_{C1}$ may be defined by the equation $F_{C1}=1-A_{G1}/A_{REG1}$. The fraction $F_{C1}$ may also be called as the coverage ratio of the flat regions C1. The sum of the coverage ratio $F_{G1}$ of the grooves G1 and the coverage ratio $F_{C1}$ of the flat regions C1 may be equal to one.

The grooves G1 may cause a loss $\Delta I_{B11}$ of intensity $I_{B11}$ of light B11, which is transmitted through the substrate SUB1. The grooves G1 may cause optical attenuation ($\Delta I_{B11}/I_{B11}$).

To the first approximation, the optical attenuation ($\Delta I_{B11}/I_{B11}$) caused by the grooves G1 may be e.g. approximately equal to $2 \cdot F_{G1}$. To the first approximation, the extinction cross section of a single groove may be approximately equal to two times the area covered by said single groove. The area covered by a single groove G1 within the region REG1 is equal to the width $w_{G1}$ of the groove G1 multiplied by the length ($L_{G1}$) of said groove G1 within said region REG1.

Thanks to the small surface coverage ratio $F_{G1}$ of the grooves G1, the optical attenuation caused by the grooves may be low. Thanks to the small surface coverage ratio $F_{G1}$ of the grooves G1, the optical transmittance of the waveguiding substrate may be high, respectively.

The area covered by the grooves G1 within the out-coupling region REG1 may be e.g. smaller than 5% of the area of the out-coupling region REG1, such that average optical attenuation ($\Delta I_{B11}/I_{B11}$) in the out-coupling region REG1 may be e.g. smaller than 20% for visible light (B11), which is transmitted through the substrate SUB1 in a direction (SZ), which is perpendicular to the first major surface SRF1. Said average optical attenuation ($\Delta I_{B11}/I_{B11}$) may be the average value of optical attenuation over the out-coupling region REG1. The average optical attenuation may also be called as the spatially averaged optical attenuation. The average attenuation may be e.g. smaller than 20% in the visible range of wavelengths from 400 nm to 760 nm. The average attenuation may include attenuation caused by the grooves G1, attenuation caused by reflection loss at the first major surface SRF1, and attenuation caused by reflection loss at the second major surface SRF2.

The average optical transmittance may be e.g. greater than 80%, respectively. The average optical transmittance of the waveguiding substrate SUB1 for visible light B11 transmitted in a perpendicular direction SZ through the waveguiding substrate SUB1 may be e.g. greater than 80% in the visible range of wavelengths from 400 nm to 760 nm. The average optical transmittance may be the average value of optical transmittance over the out-coupling region REG1. The average transmittance may be e.g. greater than 80% in the visible range of wavelengths from 400 nm to 760 nm. The average optical transmittance of the waveguiding substrate may take into account the intensity-reducing effect of the grooves G1, the effect of reflection losses at the surfaces SRF1, SRF2, and the effect of absorption of light inside the substrate.

The average optical attenuation may be smaller than 20% for light (B22) which is transmitted in the opposite direction (−SZ) through the substrate SUB1. The optical transmittance may be the same for both directions SZ and −SZ. The substrate SUB1 may appear as a clear transparent element for an observer EYE1 located inside (ZONE1), and also for an observer EYE1 located outside (ZONE2).

The substrate SUB1 may be a substantially planar waveguiding plate. The planar waveguiding plate may be flat or curved. The substrate SUB1 may confine the guided light B1 by total internal reflection, which takes place on the major surfaces SRF1, SRF2.

The substrate SUB1 may comprise optically transparent material. For example, the substrate SUB1 may comprise or consist of plastic, glass, silica ($SiO_2$) or sapphire ($Al_2O_3$).

The substrate SUB1 may comprise or consist of Poly (methyl methacrylate) (PMMA). The substrate SUB1 may comprise or consist of polycarbonate. The substrate SUB1 may comprise or consist of polyethylene terephthalate (PET).

The light-deflecting grooves G1 may be formed e.g. by embossing, hot embossing, molding, injection molding, immolding, etching, machining, laser processing, laser engraving, mechanical engraving, chemical etching, mechanical etching, printing, nanoimprinting, ablative manufacturing and/or additive manufacturing. The devices 500 and/or the substrates SUB1 may be produced in large scale e.g. by forming the microscopic grooves G1 on a plastic substrate. The grooves G1 may be formed on the substrate e.g. in a roll-to-roll process.

An embossing tool or a mold may comprise microscopic protrusions, which may form the grooves G1 on the substrate SUB1 when pressed against the substrate SUB1. The embossing tool or the mold may be formed e.g. by photolithography, electron beam lithography, etching, chemical etching, electron beam etching, electroplating, laser engraving, mechanical engraving, machining, laser processing, electron beam, ablative manufacturing and/or additive manufacturing.

The grooves G1 may deflect light primarily by reflection and/or refraction. The grooves G1 may deflect light also by scattering. The substrate SUB1 may comprise a plurality of light-deflecting grooves G1 implemented on at least one major surface SRF1, SRF2 of the substrate SUB1.

The width $w_{G1}$ of the features G1 may be slightly greater than the wavelength $\lambda$ of visible light. Forming the deflected light B2 may be modeled e.g. by the Rigorous theory of light scattering.

The device 500 may be arranged to provide a high intensity of the guided light B1 propagating in the substrate SUB1, so as to provide a sufficient intensity of the dazzling light B2.

The scattering cross-section of an individual groove G1 for coupling light out of the substrate SUB1 may be small, due to the narrow width of the grooves G1. The small scattering cross-section of the grooves G1 may be compensated by increasing the intensity of the guided light B1 propagating in the substrate SUB1. The intensity of the guided light B1 may be increased e.g. by increasing the optical power of the light sources LED1, by improving optical coupling from the light sources LED1 to the substrate SUB1 and/or by reducing the thickness of the substrate SUB1.

The light sources LED1 may operate by converting electrical energy into light B0. Increasing the optical power of the light sources LED1 may increase consumption of electric power.

Reducing the thickness of the substrate SUB1 may allow reducing the consumption of electric power. The thickness $t_{SUB1}$ of the substrate SUB1 may be e.g. in the range of 20 to 2000 times the depth $h_{G1}$ of the grooves G1. The thickness of the substrate SUB1 may e.g. in the range of 20 µm to 2000 µm.

In an embodiment, the distances $e_1$ between adjacent grooves G1 may be arranged to exhibit variation so as to reduce or avoid diffraction effects. The diffraction may e.g. cause a colorful rainbow effect, which may disturb vision of the observer EYE1.

Figure 2B:
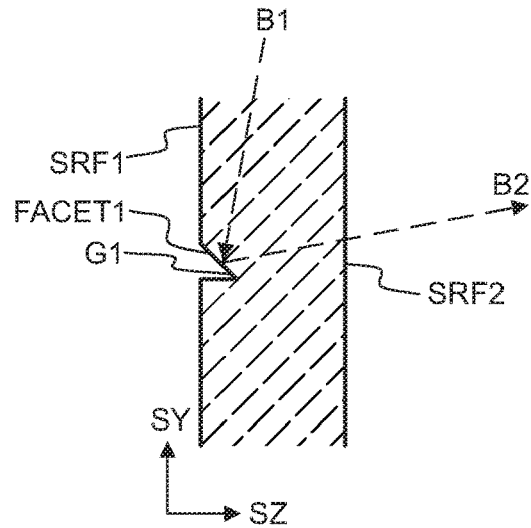
FIG. 2b shows, by way of example, in a cross-sectional side view, a light-deflecting groove, which has triangular cross-section.
Figure 2C:
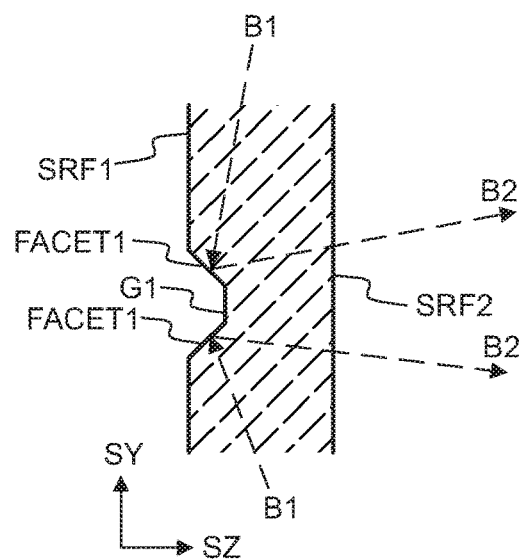
FIG. 2c shows, by way of example, in a cross-sectional side view, a light-deflecting groove, which has trapezoidal cross-section.

The cross-sectional shape of the light-deflecting grooves G1 may be e.g. triangular (FIG. 2a, FIG. 2b) or trapezoidal (FIG. 2c).

Figure 3A:
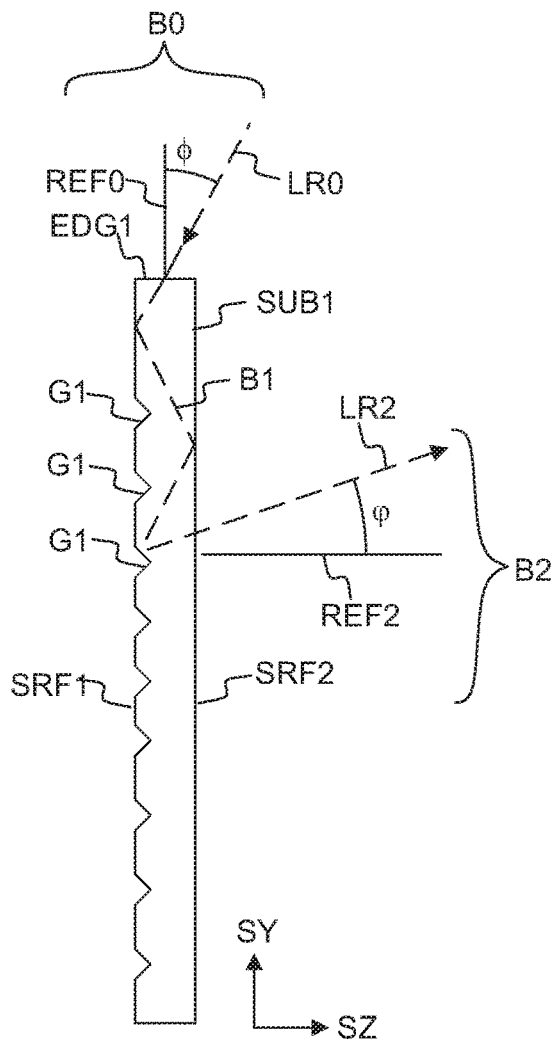
FIG. 3a shows, by way of example, in a cross-sectional side view, input angle of a light ray, and an output angle of a light ray.

Referring to FIG. 3a, a light source LED1 may provide an input light beam B0, which may be coupled into the substrate SUB1. The guided light B1 propagating inside the substrate SUB1 may be formed by coupling the input light B0 into the substrate SUB1. The input light B0 may be coupled into the substrate SUB1 e.g. through an edge EDG1 of the substrate SUB1. The light source or sources LED1 may be e.g. outside the substrate SUB1.

The light source LED1 may emit e.g. substantially white light so as to block vision of the observer EYE2 in the whole range of visible wavelengths 400 nm to 760 nm.

The device 500 may also comprise one or more first light sources (LED1) to emit light of first color (e.g. red color), the device 500 may comprise one or more second light sources (LED1) to emit light of second color (e.g. green color), and the device 500 may comprise one or more third light sources (LED1) to emit light of third color (e.g. blue color).

The light source LED1 may be e.g. a light emitting diode, a gas discharge lamp, or an incandescent lamp (e.g. tungsten halogen lamp). The light source LED1 may be e.g. cold cathode fluorescent lamp. The light source LED1 may be e.g. a laser light source. The light source may be e.g. a laser diode.

Light emitting diodes may have small size and high efficiency for converting electrical power into visible light. The light B0 emitted from light emitting diodes may be easily coupled e.g. to an edge of the substrate SUB1.

An incandescent lamp may generate infrared radiation (IR) in addition to visible light.

One or more light sources LED1 may be arranged to emit infrared radiation. One or more light sources LED1 may be arranged to emit infrared radiation in addition to emitting visible light. The infrared radiation may be arranged to heat one or more material layers (SUB1, CLAD2, 120) of the visibility control device 500, e.g. in order to evaporate fog, water droplets, ice and/or snowflakes away from one or more surfaces of the device 500.

The input light beam B0 may be used as input light for the substrate SUB1. The input light B0 may have an angular intensity distribution $I_{B0}(\phi)$. The angular intensity distribution $I_{B0}(\phi)$ may have an angular width $\Delta\phi_{B0}$. The input light beam B0 may be formed of light rays LR0, which propagate in different directions ($\phi$) with different angular intensities. The input angle $\phi$ may denote an angle between the direction of propagation of a light ray LR0 and a reference plane REF0. The reference plane REF0 may be e.g. parallel with the first major surface SRF1 of the substrate SUB1. The reference plane REF0 may be perpendicular to the input edge EDG1 of the substrate SUB1.

The light-deflecting grooves G1 may form deflected light B2 by reflecting, refracting and/or scattering guided light B1, which propagates within the substrate SUB1. The deflected output light B2 may have an angular intensity distribution $I_{B2}(\varphi)$. The angular intensity distribution $I_{B2}(\varphi)$ may have an angular width $\Delta\varphi_{B2}$.

The deflected light B2 may be formed of light rays LR2, which propagate in different directions ($\varphi$) with different angular intensities. The output angle $\varphi$ may denote an angle between the direction of propagation of a light ray LR2 and a reference plane REF2. The reference plane REF2 may be perpendicular to the first major surface SRF1 of the substrate SUB1. The reference plane REF2 may be parallel with an input edge EDG1 of the substrate SUB1. The light rays LR2 may propagate e.g. in a plane which is perpendicular to the first major surface SRF1 and perpendicular to the input edge EDG1 of the substrate SUB1.

Figure 3B:
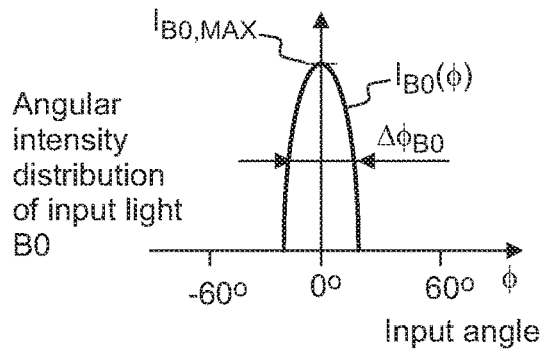
FIG. 3b shows, by way of example, angular intensity distribution of input light.
Figure 3C:
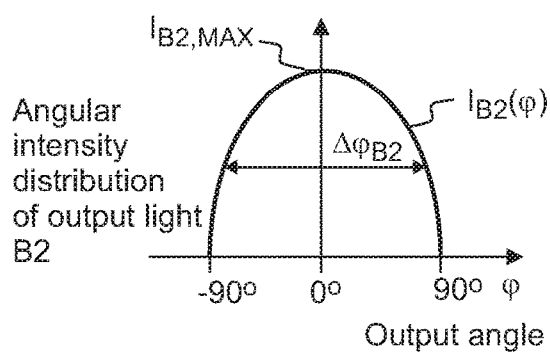
FIG. 3c shows, by way of example, angular intensity distribution of output light.

Referring to FIGS. 3b and 3c, the substrate SUB1 may map the angular input intensity distribution $I_{B0}(\phi)$ of the input light B0 into the angular output intensity distribution $I_{B2}(\varphi)$ of the deflected light B2.

Figure 3D:
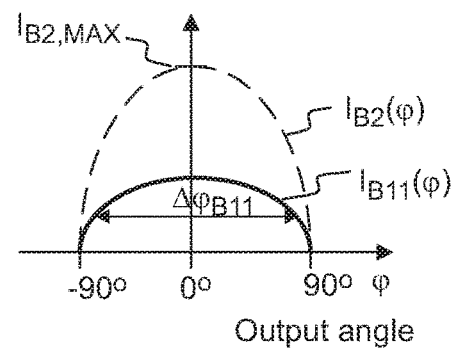
FIG. 3d shows, by way of example, angular intensity distribution of output light, and angular intensity distribution of light transmitted through the substrate to the second viewing region.

Referring to FIG. 3d, the visibility control device 500 may be arranged to operate such that, in each possible viewing direction ($\varphi$), the angular intensity $I_{B2}(\varphi)$ of the deflected light B2 is substantially greater than the intensity $I_{B11}(\varphi)$ of the light B11 received from the first viewing region ZONE1.

The optical power of the light sources LED1, the angular distribution $I_{B0}(\phi)$, the thickness $t_{SUB1}$ of the substrate SUB1, and the dimensions of the light-deflecting grooves G1 may be selected such that the angular intensity $I_{B2}(\varphi)$ of the deflected light B2 is substantially greater than the intensity $I_{B11}(\varphi)$ of the light B11 received from the first viewing region ZONE1, for each viewing angle φ which is within a predetermined range of possible viewing directions.

Figure 4:
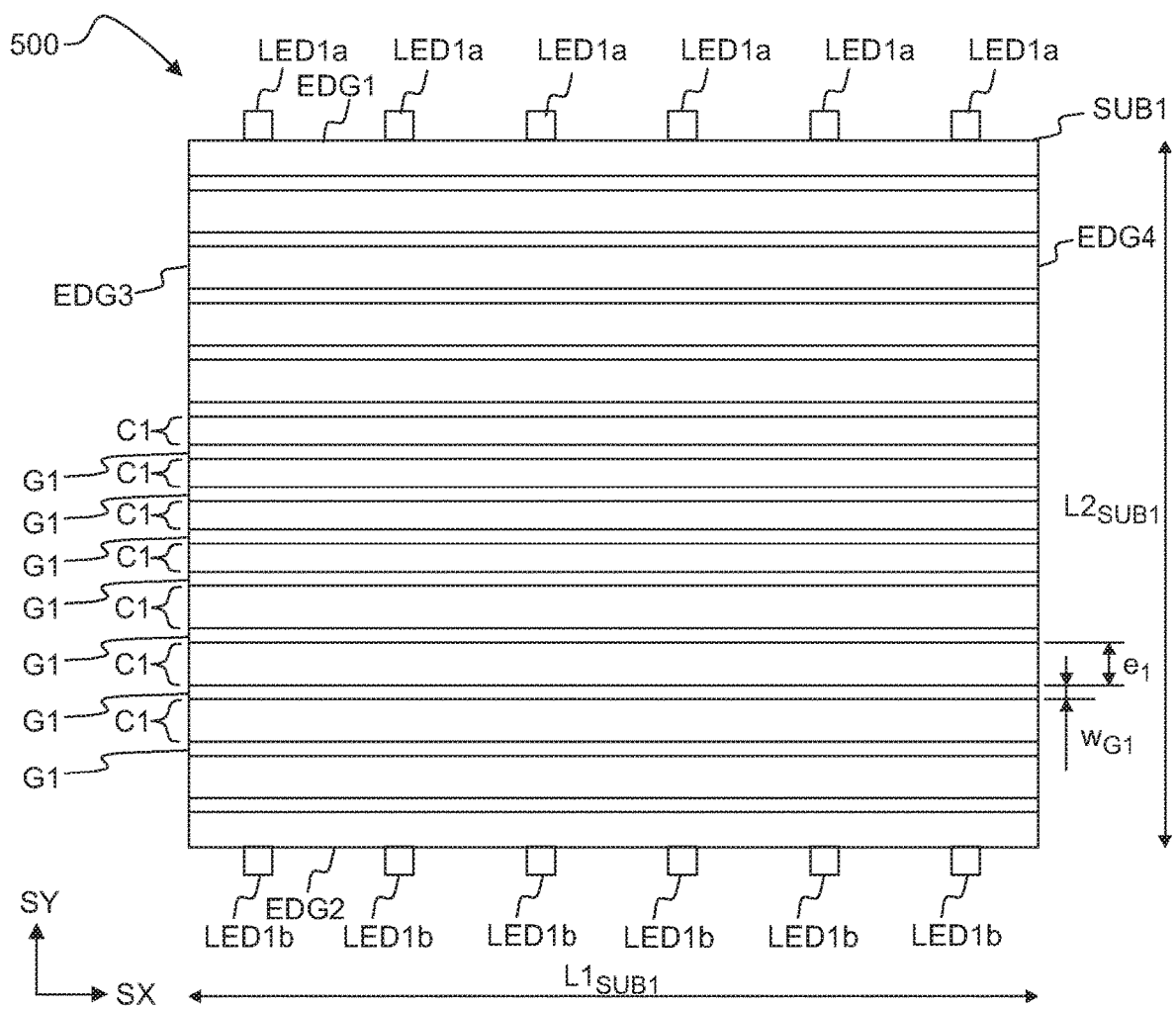
FIG. 4 shows, by way of example, in a front view, grooves and clear areas of a waveguiding substrate.

Referring to FIG. 4, the substrate SUB1 may comprise a plurality of clear viewing regions C1 between adjacent grooves G1. The substrate SUB1 may comprise a plurality of clear viewing regions C1 outside the area, which is covered by the grooves G1. The light-deflecting grooves G1 may be implemented on the first major surface SRF1 and/or on the second major surface SRF2. The first major surface SRF1 and/or the second major surface SRF2 may have substantially flat smooth surface in the clear viewing regions C1, so as to allow unobstructed viewing through the substrate SUB1. In an embodiment, the light-deflecting grooves G1 and the clear viewing regions C1 may together cover e.g. a whole viewing area of a window panel of a building.

The total area covered by the grooves G1 may be smaller than 5% of the area of the first major surface SRF1. The total (combined) area of the clear viewing regions C1 of the first major surface SRF1 may be greater than 95% of the area of the first major surface SRF1, respectively. Furthermore, the total (combined) area of the clear viewing regions C1 of the second major surface SRF2 may be greater than 95% of the area of the second major surface SRF2.

The maximum distance $e_1$ between adjacent grooves G1 may be e.g. smaller than 0.6 mm so that the substrate SUB1 may appear to have a substantially uniform surface when viewed by the naked human eye from a normal viewing distance of 1 m. The substrate SUB1 may comprise a plurality of clear viewing regions C1 between the grooves G1 such that the maximum distance from any point of the clear viewing regions C1 to the closest groove G1 is e.g. smaller than 0.3 mm, respectively.

The substrate SUB1 may be e.g. substantially rectangular, when viewed in a direction SZ, which is perpendicular to the major surfaces SRF1, SRF2.

The substrate SUB1 may have a dimension $L1_{SUB1}$ in the direction SX, and a dimension $L2_{SUB1}$ in the direction SY. The dimension $L1_{SUB1}$ may be e.g. the length of the substrate SUB1, and the dimension $L2_{SUB1}$ may e.g. the width of the substrate SUB1. When used as a window panel of a room, the substrate SUB1 may have a horizontal dimension $L1_{SUB1}$ and a vertical dimension $L2_{SUB1}$. The visibility control device may be used e.g. as a window of a building. The dimensions ($L1_{SUB1}$, $L2_{SUB1}$) may be e.g. in the range of 0.2 m to 5 m.

Figure 5A:
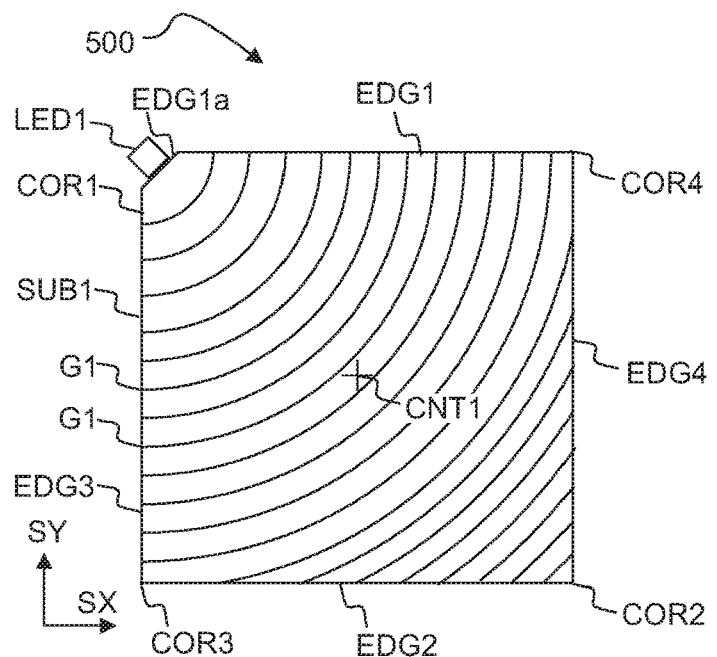
FIG. 5a shows, by way of example, in a front view, a visibility control device, which comprises a light source at a corner region of the substrate.

Referring to FIG. 5a, the device 500 may comprise one or more light sources LED1 at a corner region COR1 of the substrate SUB1. Arranging all light sources LED1 at a single corner (COR1) or within a small region at an edge (EDG1) may facilitate feeding electric power to the light sources LED1. The input light B0 may be coupled into the substrate SUB1 e.g. via an edge EDG1a.

The grooves G1 may also have e.g. a curved shape when viewed from a direction (SZ), which is perpendicular to the major surface SRF1.

The distance ($e_1$) between adjacent grooves G1 may be different in different positions of the substrate SUB1. The distances ($e_1$) between adjacent grooves G1 may be selected to provide a substantially uniform spatial intensity distribution for the deflected light B2. For example, the device 500 may be arranged to operate such that the brightness of deflected light B2 at the center CNT1 of the substrate SUB1 is substantially equal to the brightness of deflected light B2 at a corner COR2 of the substrate SUB1.

Figure 5B:
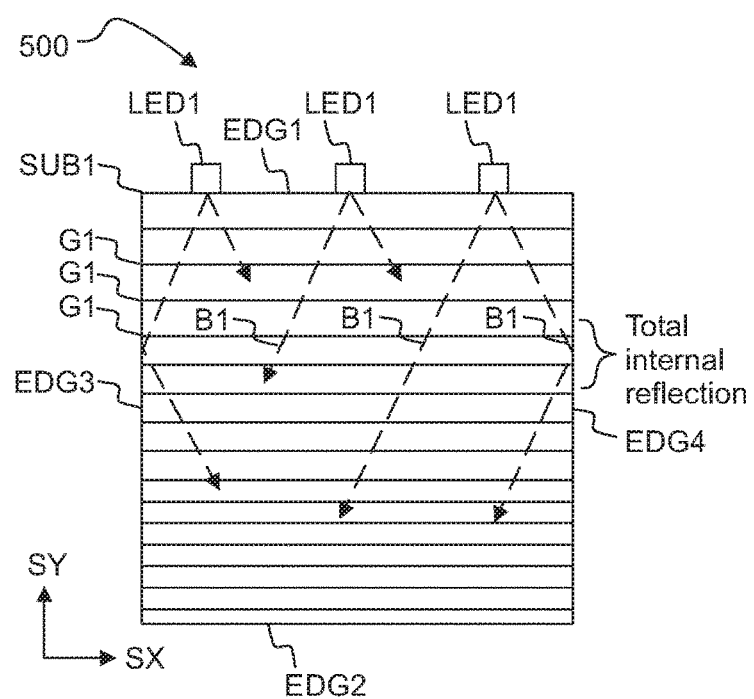
FIG. 5b shows, by way of example, in a front view, a visibility control device, which comprises light sources at an edge of substrate.

Referring to FIG. 5b, the device 500 may comprise a plurality of light sources LED1 arranged in a spatially distributed manner along an edge EDG1 of the substrate SUB1. The device 500 may comprise e.g. three or more light sources LED1 arranged in a spatially distributed manner along an edge EDG1 of the substrate SUB1.

Arranging the light sources LED1 in the spatially distributed manner may facilitate providing a more uniform spatial intensity distribution for the deflected light B2. Arranging the light sources LED1 in the spatially distributed manner may provide more efficient cooling of the light sources LED1. Consequently, the spatially distributed light sources LED1 may have increased power and/or may have improved efficiency for converting electrical power into light.

The major surfaces SRF1, SRF2 of the substrate SUB1 may confine the guided light B1 by total internal reflection (TIR). In addition, also at least one edge (EDG3, EDG4) of the substrate SUB1 may be arranged to confine the guided light B1 by reflecting the light. In particular, at least one edge (EDG3, EDG4) of the substrate SUB1 may be arranged to confine the guided light B1 by total internal reflection (TIR). The at least one edge (EDG3, EDG4) may prevent the guided light B1 from escaping from the substrate SUB1 through said edge. The reflection at the edge (EDG3, EDG4) may increase the intensity of the deflected light B2, may facilitate providing a more uniform spatial intensity distribution of the deflected light B2, and/or may reduce consumption of electric power.

Figure 5C:
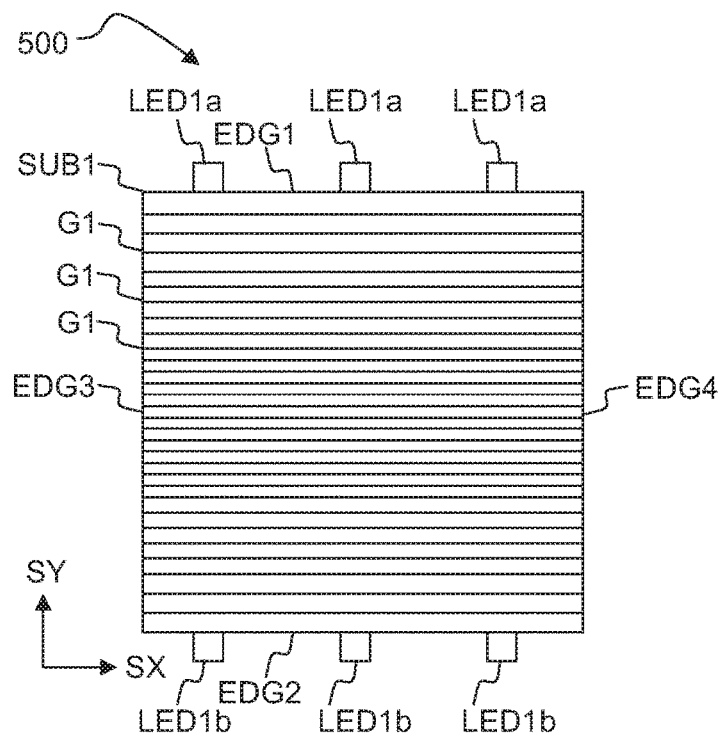
FIG. 5c shows, by way of example, in a front view, a visibility control device, which comprises first light sources at a first edge of the substrate, and which comprises second light sources at a second edge of the substrate.

Referring to FIG. 5c, the device 500 may comprise a first group of light sources LED1a arranged in a spatially distributed manner along a first edge EDG1 of the substrate SUB1. The device 500 may comprise a second group of light sources LED1b arranged in a spatially distributed manner along a second edge EDG2 of the substrate SUB1.

Figure 5D:
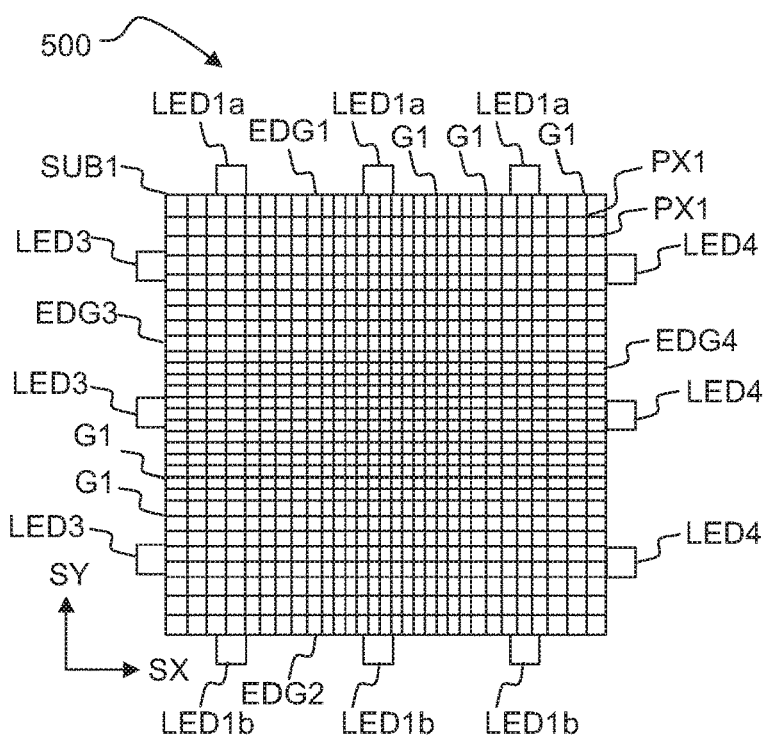
FIG. 5d shows, by way of example, in a front view, a visibility control device, which comprises light sources at several edges of the substrate.

Referring to FIG. 5d, the device 500 may comprise light sources LED1a, LED1b, LED3, LED4 arranged in a spatially distributed manner along one, two, three or four edges (EDG1, EDG2, EDG3, EDG4) of the substrate SUB1.

In an embodiment, the device 500 may comprise a first set of substantially parallel grooves G1, which have a first orientation, and a second set of substantially parallel grooves, which have a second different orientation. A groove G1 may optionally intersect other grooves G1 at intersection points PX1.

Referring to FIG. 6a, the device 500 may comprise one or more cladding layers CLAD1, CLAD2 to ensure total internal reflection at the first major surface SRF1 and/or at the second major surface SRF2 of the substrate SUB1. The substrate SUB1 may be stacked between the cladding layers CLAD1, CLAD2. A first cladding layer CLAD1 may be in contact with the first major surface SRF1 of the substrate SUB1. A second cladding layer CLAD2 may be in contact with the second major surface SRF2 of the substrate SUB1. The substrate SUB1 may have a reflective index $n_{SUB1}$. The first cladding layer CLAD1 may have a refractive index $n_{CLAD1}$. The second cladding layer CLAD2 may have a refractive index $n_{CLAD2}$. The refractive index $n_{SUB1}$ of the substrate SUB1 may be higher than the refractive indices $n_{CLAD1}$, $n_{CLAD2}$ of the cladding layers in order to provide the total internal reflection at the surfaces SRF1, SRF2. The cladding layer CLAD1 and/or CLAD2 may comprise e.g. transparent plastic, transparent adhesive or transparent oil to provide a refractive index ($n_{CLAD1}$, $n_{CLAD2}$), which is lower than the refractive index nSUB1 of the substrate SUB1.

The cladding layers CLAD1, CLAD2 may also mechanically protect the surfaces SRF1, SRF2. For example, the cladding layers CLAD1, CLAD2 may protect the surfaces SRF1, SRF2 from dust and scratching.

Referring to FIG. 6b, the device 500 may further comprise a semi-transparent layer M1 to make the dazzling effect of the deflected light B2 more efficient.

Referring to FIG. 7, first object light B11 may be obtained from a first object OBJ1 located in the first region ZONE1. The semi-transparent mirror M1 may reflect a first part B11R of the object light B11 back to the first region ZONE1, wherein a second part B11T of the object light B11 may be transmitted through the visibility control device 500 to the second region ZONE2.

Consequently, the semi-transparent mirror layer M1 may make the dazzling effect of the deflected light B2 more efficient, by reducing the intensity of the transmitted object light B11T. The dazzling effect may also be called e.g. as a glare effect or as a blinding effect.

Consequently, an observer EYE2 located in the second region ZONE2 may find it difficult or impossible to detect optical features of the first object OBJ1 because the intensity of the transmitted object light B11T is attenuated by the semi-transparent mirror M1, when compared with the intensity of the deflected light B2.

For example, the device 500 may be arranged to operate such that the intensity of the deflected light is greater than the maximum intensity of object light B11T transmitted through the device 500.

For example, the device 500 may be arranged to operate such that the intensity of the deflected light is greater than 10 times the maximum intensity of object light B11T transmitted through the device 500.

The intensity of the deflected light B2 and the intensity of the object light (B11, B11T) may be measured in the second region ZONE2 e.g. at a distance of 1 m from the substrate SUB1.

The light-deflecting grooves G1 may form deflected light B2 from the guided light G1. The second major surface SRF2 may reflect a part B2R of the deflected light B2 towards the first region ZONE1. The semi-transparent mirror layer M1 may reflect a part B2RR of the light B2R towards the second region ZONE2 so that only a minor fraction B2RT of the reflected deflected light B2R is transmitted through the semi-transparent mirror layer M1 to the first region ZONE1. Consequently, the semi-transparent mirror layer M1 may reduce the disturbing effect of the reflected deflected light B2R. Consequently, an observer EYE1 located inside in the first region ZONE1 may easily see the object OBJ2, which is located outside in the second region ZONE2.

Second object light B22 may be received from a second object OBJ2, which is located in the second region ZONE2. The semi-transparent mirror layer M1 may transmit a part B22T of the second object light B22 to the first region ZONE1. The semi-transparent mirror layer M1 may reflect a part B22R of the second object light B22 to the second region ZONE2.

Figure 8A:
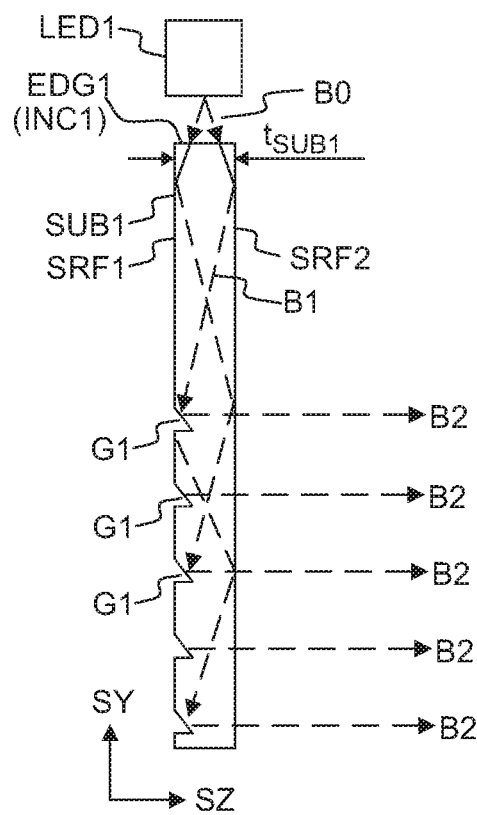
FIG. 8a shows, by way of example, in a cross-sectional side view, coupling of light into the substrate via an edge facet.
Figure 8B:
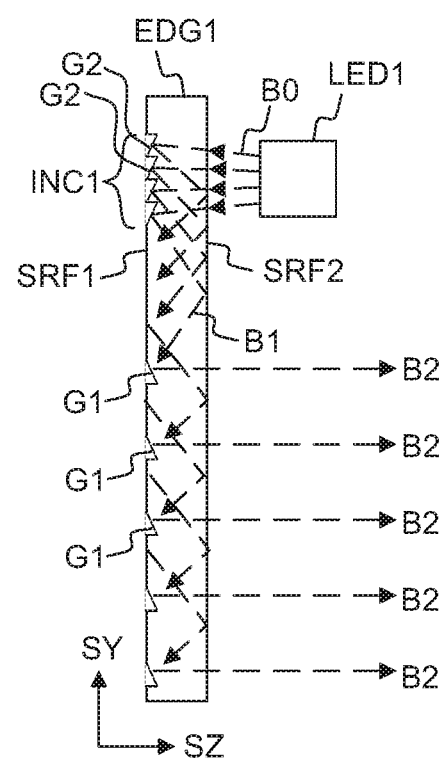
FIG. 8b shows, by way of example, in a cross-sectional side view, coupling of light into the substrate via a major surface of the substrate, by using an in-coupling element.
Figure 8C:
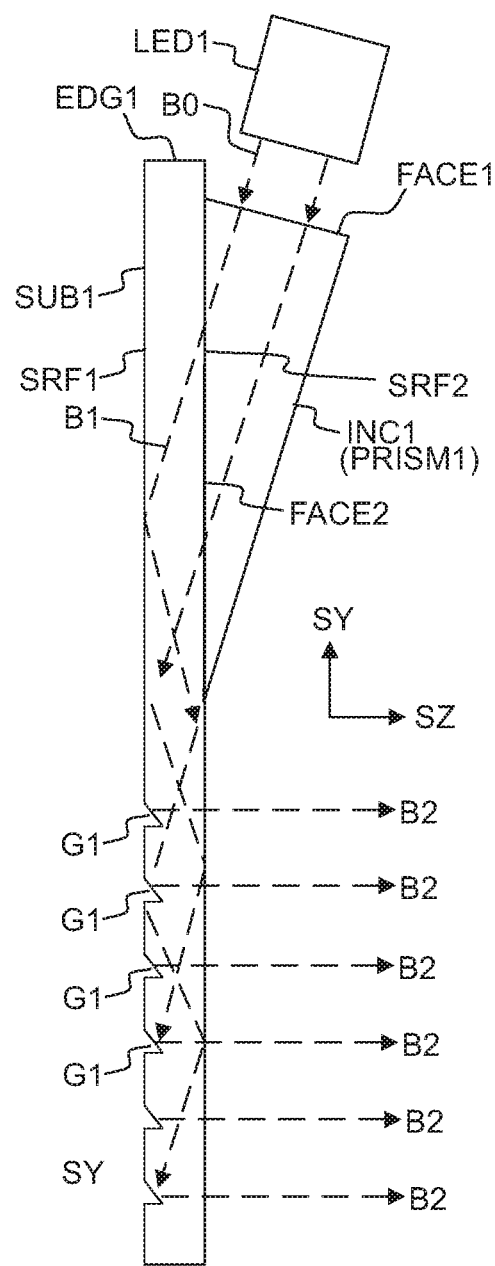
FIG. 8c shows, by way of example, in a cross-sectional side view, coupling of light into the substrate via a major surface of the substrate, by using an in-coupling prism.

Referring to FIGS. 8a to 8c, the device 500 may comprise one or more in-coupling elements INC1 to form guided light B1 by coupling input light B0 into the substrate SUB1.

Referring to FIG. 8a, input light B0 obtained from a light source LED1 may be coupled into the substrate SUB1 e.g. through an edge EDG1 of the substrate SUB1. The edge EDG1 may operate as an in-coupling element INC1.

Input light B0 may be directly coupled from an emitter to the edge EDG1.

The device 500 may optionally comprise e.g. focusing optics to focus input light B0 to the edge EDG1. The device 500 may comprise refractive and/or reflective focusing optics. For example, the device 500 may comprise an elliptical reflector to focus input light B0 from a linear cold cathode fluorescent lamp to an edge of the substrate SUB1.

Coupling of light B0 into the edge EDG1 may be difficult in a situation where the thickness $t_{SUB1}$ of the substrate SUB1 is small when compared with the smallest dimension of the light emitter (LED1).

Referring to FIG. 8b, the input light B0 may also be coupled into the substrate SUB1 via the major surface SRF1 and/or SRF2, by using an in-coupling element INC1. The in-coupling element INC1 may comprise e.g. one or more grooves G2, which are arranged to form guided light B1 by reflecting and/or refracting input light B0 received from a light source LED1.

Referring to FIG. 8c, the input light B0 may also be coupled into the substrate SUB1 by using an in-coupling prism PRISM1. The prism PRISM1 may operate as an in-coupling element INC1. The in-coupling prism PRISM1 may comprise an input facet FACE1 to form the guided light B1 by coupling the input light B0 into the prism PRISM1. The prism PRISM1 may comprise a second coupling facet FACE2 to couple the guided light B1 from the prism PRISM1 to the substrate SUB1 through the major surface SRF1 or SRF2. The coupling facet FACE2 may be in contact with the major surface SRF1 or SRF2.

The in-coupling arrangement of FIG. 8b or 8c may be used e.g. in a situation where the light emitter (LED1) is large when compared with the thickness $t_{SUB1}$ of the substrate SUB1.

Referring to FIG. 9a, the major surface SRF1 and/or SRF2 may be arranged to operate as a gas-solid interface, in order to provide total internal reflection (TIR). For example, the surfaces SRF1, SRF2 may be in contact with air, nitrogen or argon. Total internal reflection at the gas-solid interface may be substantially lossless, i.e. optical power is not absorbed at the reflection point. The gas-solid interface may provide a low-cost solution for providing a substrate SUB1, which has a larger area. The gas-solid interface may provide a low-cost solution for providing a device 500, which is used e.g. as a window panel of a room.

The visibility control device 500 may comprise transparent protective layers 110, 120 e.g. to mechanically protect the surfaces SRF1, SRF2. Any scratches or dust particles deposited on the surfaces SRF1, SRF2 may be easily visible, due to the high intensity of the guided light B1 propagating within the substrate SUB1. The protective layers 110, 120 may be e.g. transparent glass plates or plastic plates. The device 500 may comprise a plurality of (narrow) spacer elements SPC1 to define a gap GAP1, GAP2 between the substrate SUB1 and the protective layers 110, 120. The gaps GAP1, GAP2 may allow large freedom to select the material of the transparent protective layers 110, 120. The transparent protective layers 110, 120 may have any refractive index.

Referring to FIG. 9b, the device 500 may further comprise the semi-transparent mirror layer M1 to increase the dazzling effect of the deflected light B2 and/or to reduce the intensity of leaking light (B2RT). The mirror layer M1 may be implemented e.g. on an inner side or on an outer side of a protective layer 110. The mirror layer M1 may be deposited e.g. between the protective layer 110 and the substrate layer SUB1 so that the protective layer 110 may protect also the mirror layer M1 from scratches.

The semi-transparent mirror layer M1 may be e.g. a semi-transparent metallic film, which has been deposited on a polymer film.

Figure 9C:
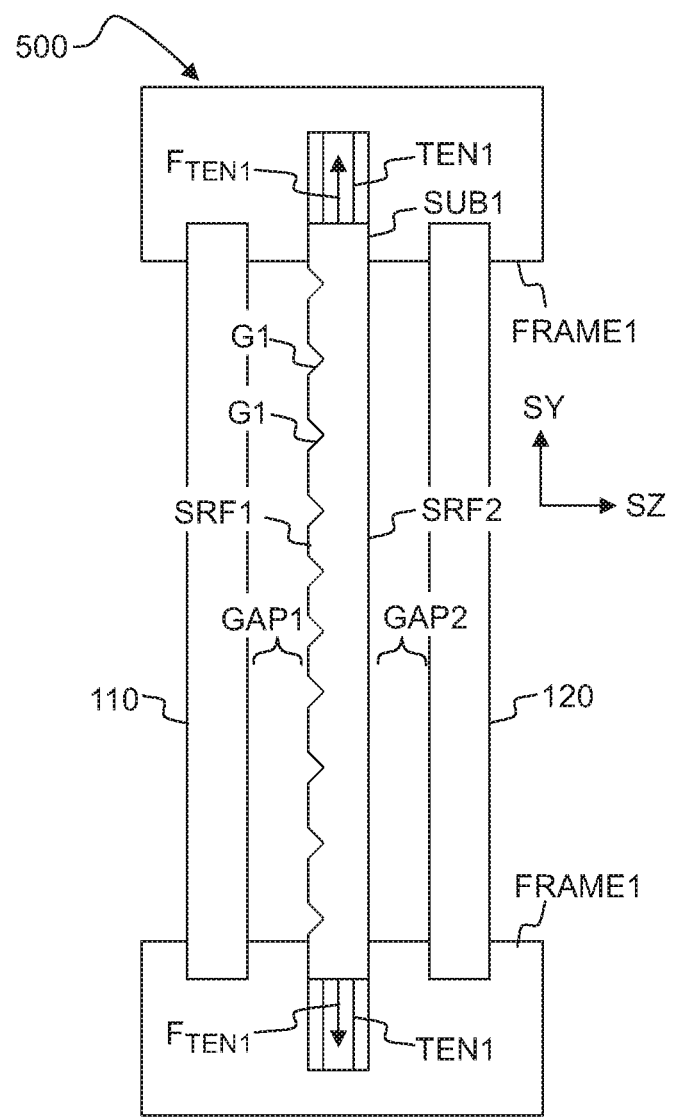
FIG. 9c shows, by way of example, in a cross-sectional side view, a visibility control device, which comprises structural layers attached to a frame.
Figure 9D:
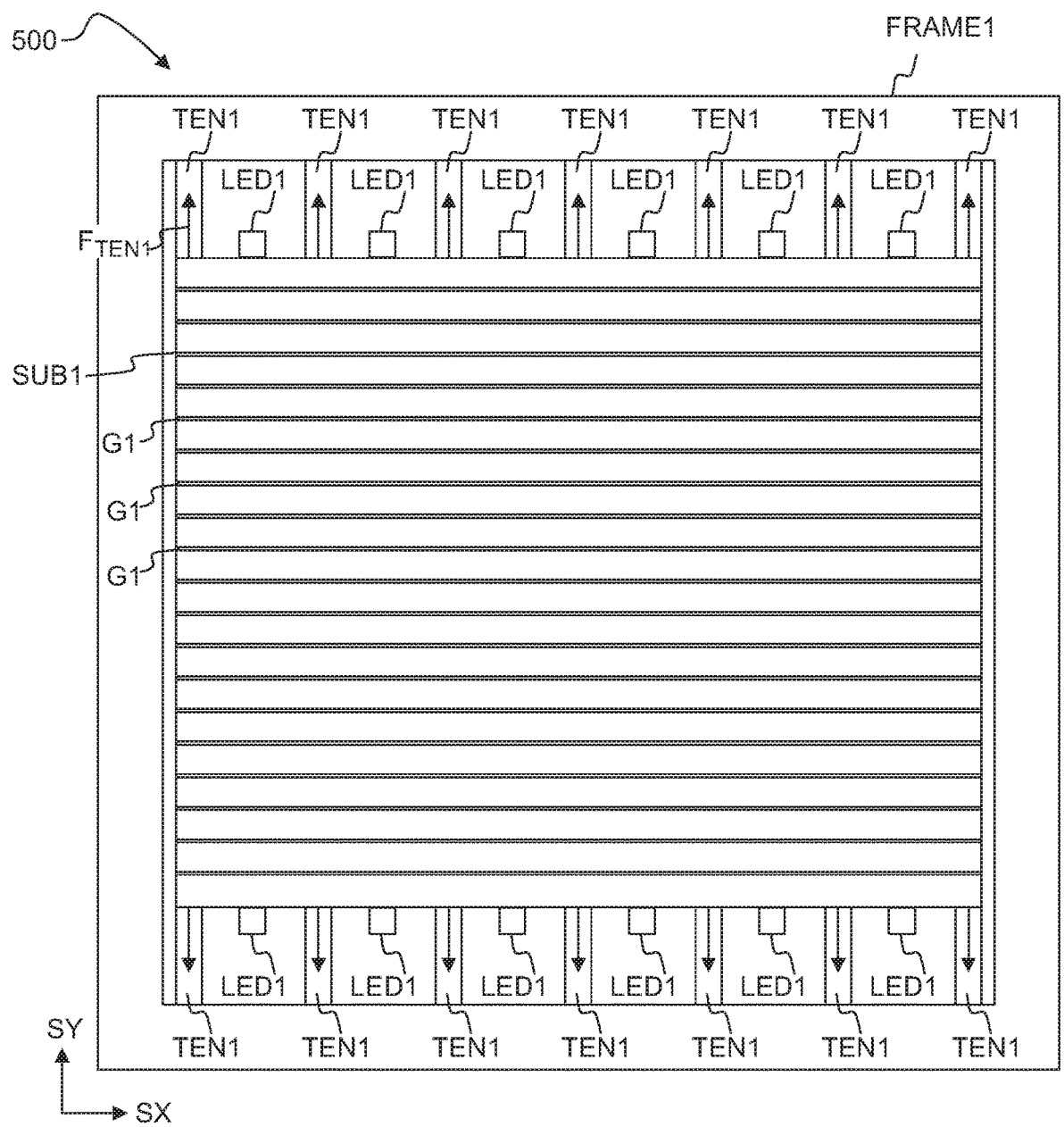
FIG. 9d shows, by way of example, in a front view, a visibility control device, which comprises a substrate attached to a frame.

Referring to FIGS. 9c and 9d, the device 500 may comprise a frame FRAME1 for defining the position of the substrate SUB1 with respect to the protective layers 110, 120.

The light sources LED1 may be attached e.g. to the substrate SUB1 and/or to the frame FRAME1.

The device 500 may be arranged to maintain the air gaps GAP1, GAP2 also without using spacer elements SPC1 between the substrate SUB1 and the protective layers 110, 120. The spacer elements SPC1 may at least partly block the vision of the observer EYE1.

For example, the substrate SUB1 may be kept in place by using the frame FRAME1 to support the edges of the substrate SUB1, wherein the device 500 does not comprise a plurality of spacer elements SPC1 to define an air gap GAP1, GAP2 between the substrate SUB1 and the protective layers 110, 120.

For example, the substrate SUB1 may be optionally kept in place by tension forces $F_{TEN1}$, which may facilitate maintaining the substantially flat form of the substrate SUB1. The device 500 may comprise e.g. a plurality of tension elements TEN1 to mechanically pull one or more edges of the substrate SUB1. The tension elements TEN1 may comprise e.g. elastic polymer and/or a metal spring to provide tension forces $F_{TEN1}$.

For example, a thin and/or flexible substrate SUB1 may be kept in place by using tension elements TEN1.

For example, the substrate SUB1 may be kept in place by using tension elements TEN1, wherein the device 500 does not comprise a plurality of spacer elements SPC1 to define an air gap GAP1, GAP2 between the substrate SUB1 and the protective layers 110, 120.

Referring to FIG. 10a, a light-deflecting groove G1 of the substrate SUB1 may comprise one or more light-deflecting facets FACET1a, FACET1b. The substrate SUB1 may comprise a plurality of grooves G1, which comprise light-deflecting facets FACET1a, FACET1b. A facet FACET1a may couple guided light B1a out of the substrate e.g. by reflecting light. For example, the first major surface SRF1 of the substrate SUB1 may comprise a plurality of grooves G1, which have reflective facets FACET1a, FACET1b.

The orientation of a first facet FACET1a of a groove G1 may be specified e.g. by an orientation angle $\beta_{1a}$. The orientation angle $\beta_{1a}$ may denote an angle between the facet FACET1a and the plane of the major surface SRF1. The orientation angle $\beta_{1a}$ is equal to the angle between surface normal of the FACET1a and the surface normal of the major surface SRF1.

The orientation of a second facet FACET1b of a groove G1 may be specified e.g. by an orientation angle $\beta_{1b}$. The orientation angle $\beta_{1b}$ may denote an angle between the facet FACET1b and the plane of the major surface SRF1. The orientation angle $\beta_{1b}$ is equal to the angle between surface normal of the FACET1b and the surface normal of the major surface SRF1.

The orientation angle $\beta_{1a}$ of a first facet FACET1a of a groove G1 may be equal to the orientation angle $\beta_{1b}$ of a second facet FACET1b of the groove G1.

A plurality of reflective grooves G1 may be implemented on the first major surface SRF1. The facets FACET1a, FACET1b may reflect guided light B1a, B1b out of the substrate SUB1. The orientation angles $\beta_{1a}$, $\beta_{1b}$ may be e.g. in the range of 30° to 50°, e.g. for using the substrate SUB1 as a window panel of a room or a vehicle.

The reflective grooves G1 may also be arranged to provide an angular intensity distribution $I_{B2a}(\varphi)$ where the intensity maximum is in a direction (DIR2a), which is different from the perpendicular direction SZ. For that purpose, the orientation angles $\beta_{1a}$, $\beta_{1b}$ may be e.g. in the range of 10° to 30°.

Referring to FIG. 10b, the grooves G1 may also be asymmetric. The orientation angle $\beta_{1a}$ may also be different from the orientation angle $\beta_{1b}$. The cross-section of a groove G1 may be e.g. substantially triangular. The apex angle $\alpha 1$ of a triangular groove G1 is equal to $180°-(\beta_{1a}+\beta_{1b})$.

Referring to FIG. 10c, the second major surface SRF2 of the substrate SUB1 may comprise a plurality of grooves G1, which have refractive facets FACET1a, FACET1b. A groove G1 may be arranged to couple guided light B1a out of the substrate SUB1 by refraction.

For example, a plurality of grooves G1 may be implemented on the second major surface SRF2 to refract guided light B1a out of the substrate SUB1. The refractive grooves G1 may be arranged to provide an angular intensity distribution $I_{B2a}(\varphi)$ where the intensity maximum is in a direction (DIR2a), which is different from the perpendicular direction SZ. The orientation angles $\beta_{1a}$, $\beta_{1b}$ of the refractive facets may be e.g. in the range of 35° to 60°.

Referring to FIG. 10d, the first major surface SRF1 of the substrate SUB1 may comprise a plurality of grooves G1, which have reflective facets FACET1a, FACET1b. A groove G1 may be arranged to couple guided light B1a out of the substrate SUB1 by reflecting the guided light B1a.

A plurality of grooves G1 may be implemented on the first major surface SRF1 of the substrate SUB1. The grooves G1 may comprise facets FACET1a, FACET1b, which are arranged to reflect guided light B1a, B1b. For example, a first reflective facet FACET1a may form first deflected light B2a by coupling first guided light B1a out of the substrate SUB1. For example, a second reflective facet FACET1b may form second deflected light B2b by coupling second guided light B1b out of the substrate SUB1.

Figure 10E:
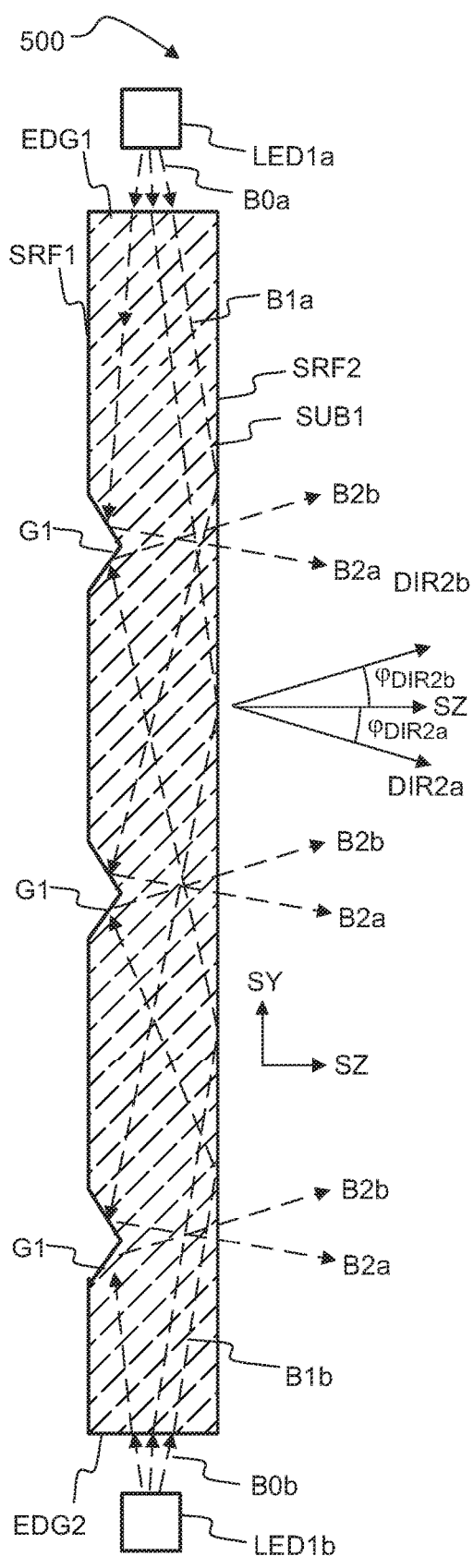
FIG. 10e shows, by way of example, in a cross-sectional side view, coupling first guided light out of the substrate, and coupling second guided light out of the substrate.

Referring to FIG. 10e, the device 500 may be arranged to provide first guided light B1a which propagates within the substrate SUB1 in a first direction (e.g. in the direction −SY), and the device 500 may be arranged to provide second guided light B1b which propagates within the substrate SUB1 in a second different direction (e.g. in the direction SY).

The device 500 may comprise one or more first light sources LED1a to provide first input light B0a. The device 500 may form first guided light B1a by coupling the first input light B0a into the substrate SUB1. The first input light B0a may be coupled into the substrate SUB1 e.g. through an edge EDG1. The device 500 may comprise one or more second light sources LED1b to provide second input light B0b. The device 500 may form second guided light B1b by coupling the second input light B0b into the substrate SUB1. The second input light B0b may be coupled into the substrate SUB1 e.g. through an edge EDG2.

The device 500 may be arranged to project first deflected light B2a such that the angular intensity distribution $I_{B2a}(\varphi)$ of the first deflected light B2a has a maximum in a direction DIR2a. The direction DIR2a may be called e.g. as a first projection direction.

The device 500 may be arranged to project second deflected light B2b such that the angular intensity distribution $I_{B2b}(\varphi)$ of the second deflected light B2b has a maximum in a direction DIR2b. The direction DIR2b may be called e.g. as a second projection direction.

The direction SZ may be perpendicular to the first major surface SRF1. The direction DIR2a may be parallel with the direction SZ or different from the direction SZ. The direction DIR2b may be parallel with the direction SZ or different from the direction SZ. The direction DIR2b may be parallel with the direction DIR2a or different from the direction DIR2a. $\varphi_{DIR2a}$ may denote an angle between the direction DIR2a and the reference plane defined by the directions SZ and SX. $\varphi_{DIR2b}$ may denote an angle between the direction DIR2b and the reference plane defined by the directions SZ and SX.

The device 500 may be arranged to provide an adjustable and/or selectable angular intensity distribution ($I_{B2}(\varphi)=I_{B2a}(\varphi)+I_{B2b}(\varphi)$). For example, the first light sources LED1a may be switched on when the second light sources LED1b remain switched off. For example, the second light sources LED1b may be switched on when the first light sources LED1a remain switched off. Yet, all light sources (LED1a, LED1b) may be switched on and off simultaneously. The device 500 may be arranged to change the optical power of the first input light B0a, and/or to change the optical power of the second input light B0b e.g. according to a control signal received from a user interface.

Figure 10F:
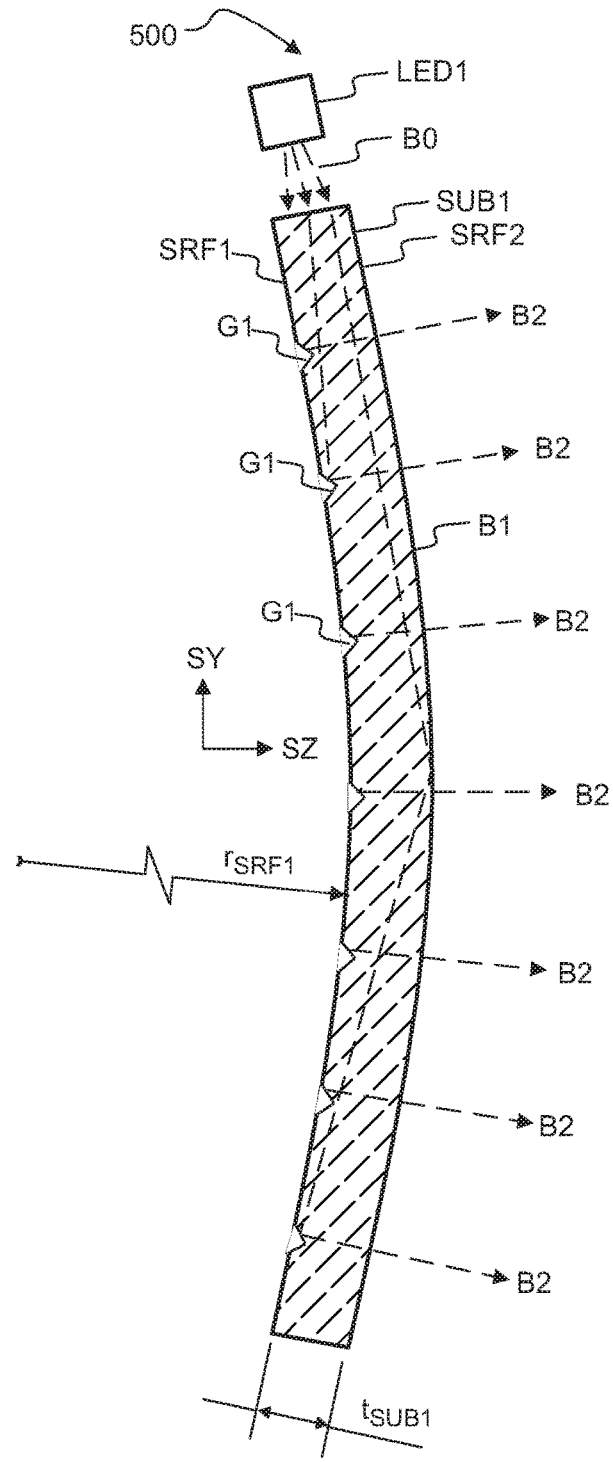
FIG. 10f shows, byway of example, in a cross-sectional side view, a curved waveguiding substrate.

Referring to FIG. 10f, the planar waveguiding substrate may also be curved. The first major surface SRF1 of the substrate SUB1 may have a finite radius $r_{SRF1}$ of curvature. The radius $r_{SRF1}$ may be e.g. smaller than 3 m. The radius $r_{SRF1}$ may be e.g. greater than 50 times the thickness $t_{SUB1}$ of the substrate SUB1. The radius $r_{SRF1}$ may be e.g. in the range of 50 to 1000 times the thickness $t_{SUB1}$ of the substrate SUB1.

The major surfaces SRF1, SRF2 of a curved planar waveguide SUB1 may be singly curved, i.e. they may be e.g. cylindrical surfaces. The major surfaces SRF1, SRF2 of a curved planar waveguide SUB1 may be doubly curved, i.e. they may be e.g. spherical surfaces.

In an embodiment, the curved planar waveguiding substrate SUB1 may be formed by forming a plurality of grooves G1 on a flat substrate, and converting the flat substrate into the curved substrate after the grooves have been formed.

Figure 11A:
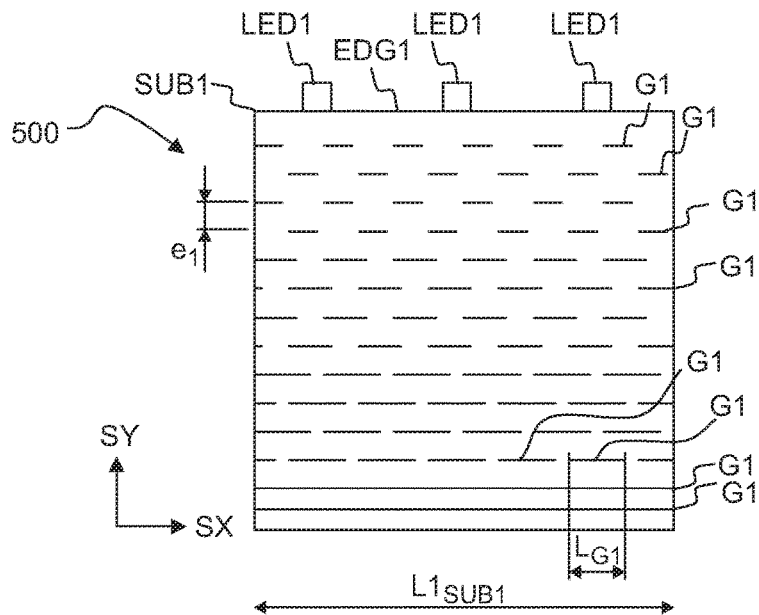
FIG. 11a shows, by way of example, in a front view, a substrate which comprises short grooves.

Referring to FIG. 11a, the substrate SUB1 may also comprise grooves G1, which are shorter than the lateral dimensions ($L1_{SUB1}$, $L1_{SUB2}$) of the substrate SUB1. The grooves G1 do not need to continuously extend from one edge of the substrate to another edge of the substrate. The length $L_{G1}$ of each groove G1 may be e.g. greater than 5 times the width $w_{G1}$ of said groove G1.

The lengths $L_{G1}$ of the grooves G1, the depths $h_{G1}$ of the grooves G1 and/or the positions (x,y) of the grooves G1 may be selected to provide a desired spatial intensity distribution $I_{B2}(x,y)$. In particular, the lengths $L_{G1}$ of the grooves G1, the depths $h_{G1}$ of the grooves G1 and/or the positions (x,y) of the grooves G1 may be selected to provide a substantially even spatial intensity distribution $I_{B2}(x,y)$.

Figure 11B:
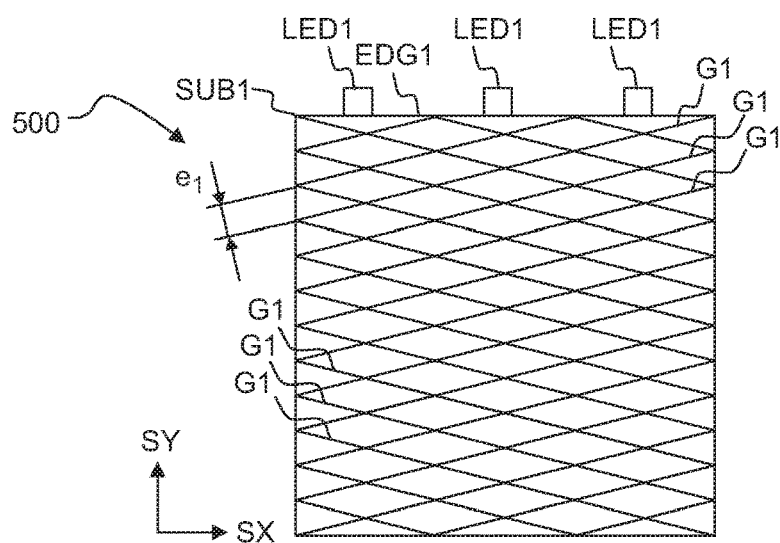
FIG. 11b shows, by way of example, in a front view, a substrate which comprises a first grooves which have a first orientation, and second grooves, which have a second different orientation.

Referring to FIG. 11b, the substrate SUB1 may comprise a plurality of grooves G1 which have a first orientation and a plurality of grooves G1 which have a second different orientation. The orientations of the grooves G1 may be selected e.g. in order to provide a desired angular intensity distribution $I_{B2}(\varphi)$.

Figure 11C:
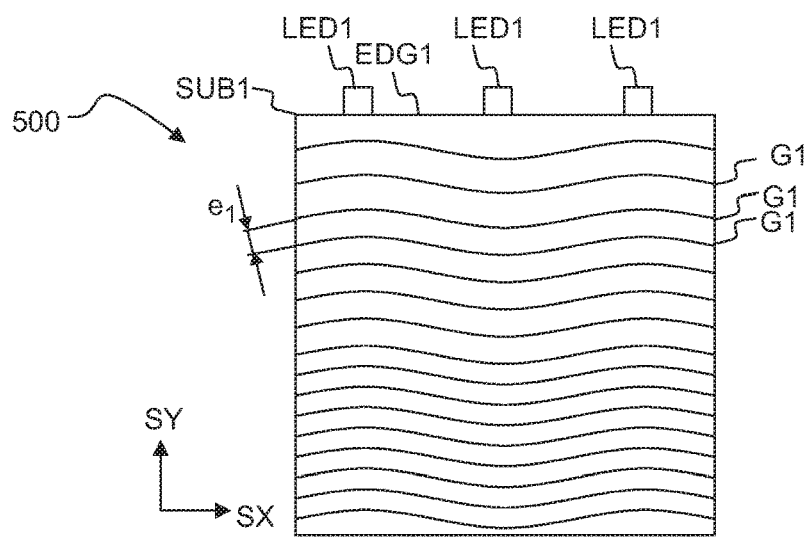
FIG. 11c shows, by way of example, in a front view, a substrate which comprises nonlinear grooves.

Referring to FIG. 11c, the substrate SUB1 may comprise a plurality of curved grooves G1.

Figure 11D:
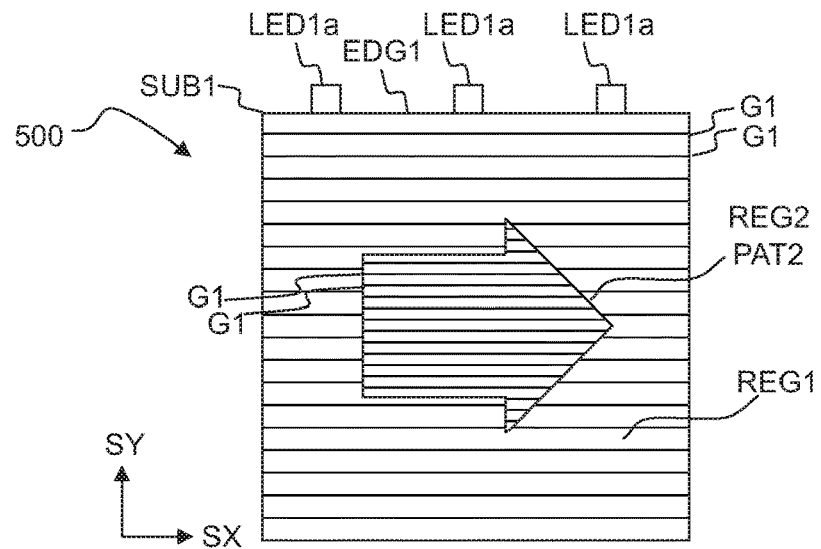
FIG. 11d shows, by way of example, in a front view, a substrate which comprises a first out-coupling region and a second out-coupling region.

Referring to FIG. 11d, the substrate SUB1 may comprise a first out-coupling region REG1 and a second out-coupling region REG2. The out-coupling properties of the first region REG1 may be different from the out-coupling properties of the second region REG2. The brightness of the first out-coupling region REG1 may be different from the brightness of the second out-coupling region REG2. The intensity of deflected light B2 projected from the first out-coupling region REG1 may be different from intensity of deflected light B2 projected from the second out-coupling region REG2. For example, the number density, the dimensions and/or the orientation of the grooves G1 of the first region REG1 may be different from the number density, the dimensions and/or the orientation of the grooves G1 of the second region REG2.

The region REG1 and/or the region REG2 may operate as a visually observable pattern PAT2. The shape of the region REG1 and/or the region REG2 may represent a graphical pattern. A boundary between the regions REG1, REG2 may operate as a visually observable pattern PAT2. The pattern PAT2 may be e.g. a graphical symbol. The pattern PAT2 may represent e.g. an arrow symbol. The pattern PAT2 may display information. The pattern PAT2 may represent e.g. a trademark symbol.

Figure 11E:
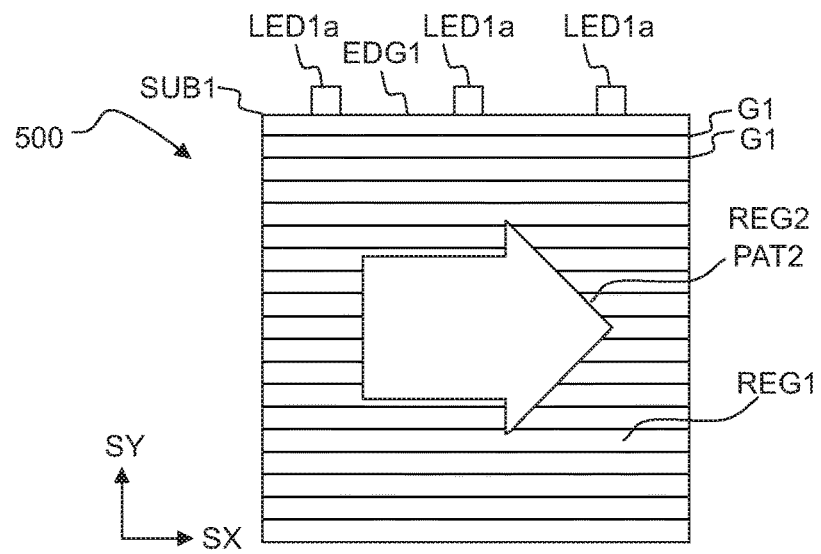
FIG. 11e shows, by way of example, in a front view, a substrate which comprises a first region and a second region.

Referring to FIG. 11e, the first region REG1 or the second region REG2 may also be implemented so that said first region REG1 or the second region REG2 does not comprise light-deflecting grooves G1. The out-coupling properties of the first region REG1 may be different from the out-coupling properties of the second region REG2. The shape of the region REG1 and/or the region REG2 may represent a graphical pattern.

Figure 11F:
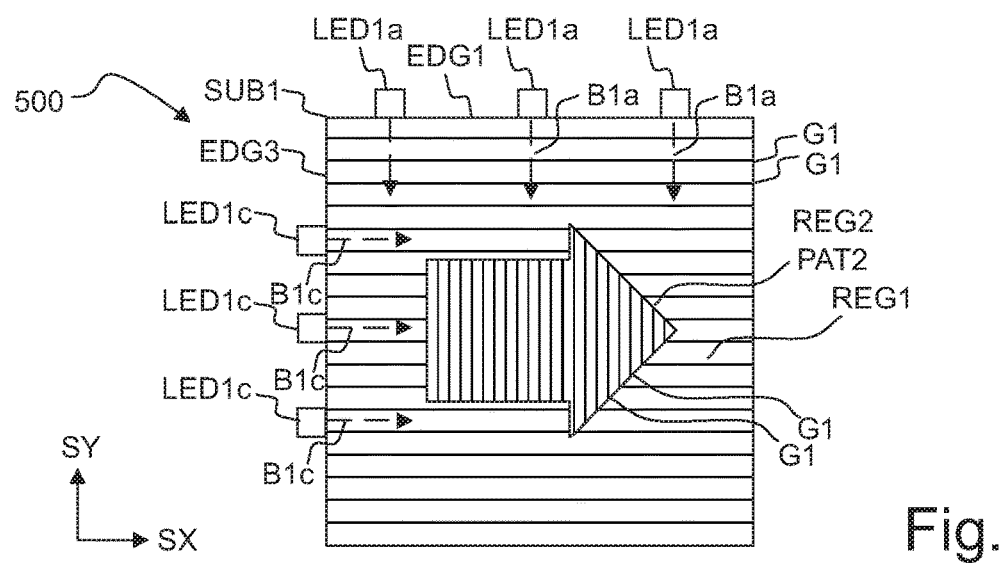
FIG. 11f shows, by way of example, in a front view, a substrate which comprises a first out-coupling region and a second out-coupling region.

Referring to FIG. 11f, the device 500 may comprise one or more first light sources LED1a to form first guided light B1a, which propagates within the substrate SUB1 in a first direction (e.g. in the direction −SY). The device 500 may comprise one or more second light sources LED1c to form second guided light B1c, which propagates within the substrate SUB1 in a second direction (e.g. in the direction SX). The direction of propagation of the first guided light B1a may be different from direction of propagation of the second guided light B1c. In particular, the direction of propagation of the first guided light B1a may be substantially perpendicular to the direction of propagation of the second guided light B1c.

The substrate SUB1 may comprise a first out-coupling region REG1 to selectively couple the first guided light B1a out of the substrate SUB1. The substrate SUB1 may comprise a second out-coupling region REG2 to selectively couple the second guided light B1c out of the substrate SUB1. The orientation of the light deflecting grooves G1 of the first out-coupling region REG1 may be different from the orientation of the light deflecting grooves G1 of the second out-coupling region REG2. The intensity of deflected light B2 projected from the first out-coupling region REG1 may be selectively changed by changing the optical output power of the first light sources LED1a. The intensity of deflected light B2 projected from the second out-coupling region REG2 may be selectively changed by changing the optical output power of the second light sources LED1c.

Figure 12A:
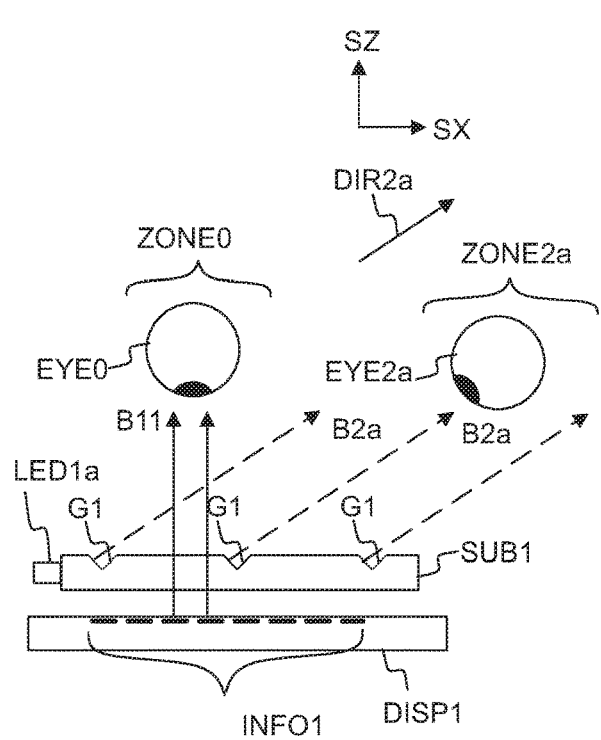
FIG. 12a shows, by way of example, in a side view, a visibility control device positioned on a display.
Figure 12B:
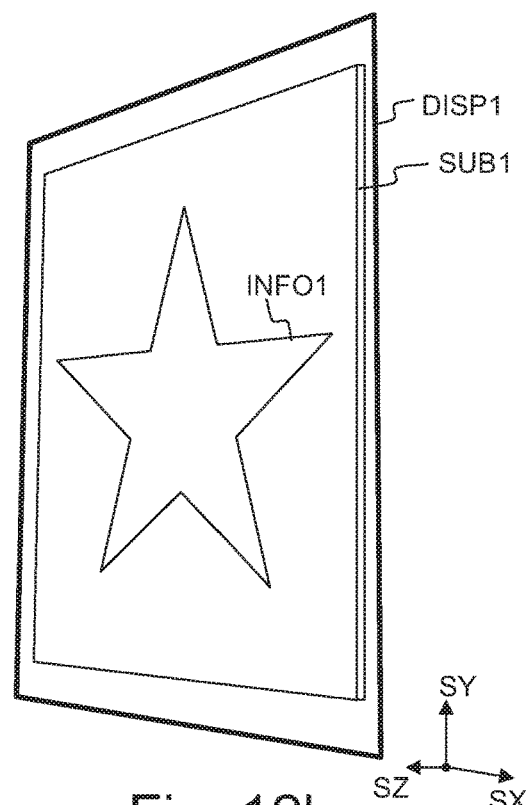
FIG. 12b shows, by way of example, in a three-dimensional view, a visibility control device positioned on a display.

Referring to FIGS. 12a and 12b, the substrate SUB1 of the visibility control device 500 may be positioned on a display DISP1, for controlling visibility of graphical information INFO1 displayed on the display DISP1. The display DISP1 may be e.g. the display of a smartphone, a display of a tablet, a display of a portable computer, a display of a check-in terminal, or a display of an on-line banking terminal. The display DISP1 and the visibility control device 500 may be used as a combination. The visibility control device 500 may be arranged to protect privacy of confidential information INFO1 displayed on the display DISP1.

The visibility control device 500 may be disposed on the display device DISP1 to allow a first person (EYE0) located in a first viewing region (ZONE0) to observe information INFO1 displayed on the display DISP1 through the substrate SUB1 of the device 500, wherein the visibility control device 500 may be arranged to prevent a second person (EYE2a) located in a second viewing region (ZONE2a) from observing the displayed information INFO1. The displayed graphical information may be carried to eye of the first person (EYE0) by light B111 emitted from the display DISP1. The information-carrying light B111 may be transmitted to from the display DISP1 to the first person (EYE0) through the substrate SUB1.

The device 500 may be stacked with the display DISP1. The visibility control device 500 may be arranged to project deflected light B2a to the second viewing region ZONE2a such that the intensity of deflected light B2a projected to the first viewing region ZONE0 is e.g. smaller than 10% of intensity of deflected light B2a projected to the second viewing region ZONE2a. The device 500 may be arranged to provide a predetermined angular intensity distribution $I_{B2a}(\varphi)$ of the deflected light B2a, so as to allow viewing from the first viewing region ZONE0 and to prevent viewing from the second viewing region ZONE2a. For example, the intensity $I_{B2a}(\alpha=0)$ projected in the direction SZ may be smaller than 10% of the maximum intensity $I_{B2a,\ MAX}$ ($\varphi_{DIR2a}$) projected in the direction DIR2a.

Figure 12C:
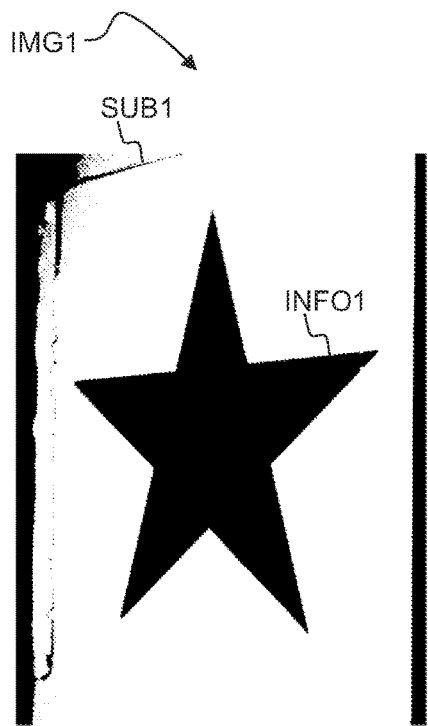
FIG. 12c shows, by way of example, in a three-dimensional view, a situation where a pattern displayed on the display may be observed when the visibility control device does not project deflected light.

FIG. 12c is an annotated photograph (IMG1), which shows visual appearance of the combination of the visibility control device 500 and the display DISP1 in a situation where the visibility control device 500 does not project deflected light B2 towards a viewer located in a second viewing region. In this situation, a viewer located in a second viewing region may observe the information INFO1 displayed on the display DISP1.

Figure 12D:
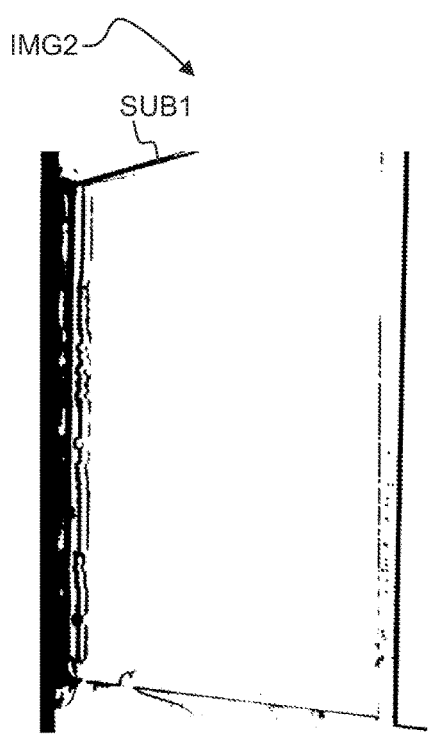
FIG. 12d shows, by way of example, in a three-dimensional view, a situation where the displayed pattern cannot be visually observed due to projected deflected light.

FIG. 12d is an annotated photograph (IMG2), which shows visual appearance of the combination of the visibility control device 500 and the display DISP1 in a situation where the visibility control device 500 projects deflected light B2 towards a viewer located in a second viewing region. In this situation, a viewer located in the second viewing region cannot observe the information INFO1 displayed on the display DISP1 due to the projected deflected light B2.

For example, a check-in terminal or an on-line banking terminal may comprise a display DISP1 to display information INFO1, wherein the substrate SUB1 of the visibility control device 500 may be disposed on the display DISP1 to protect the information INFO1. The visibility control device 500 may allow the user of the terminal (i.e. the first person EYE0) to observe the displayed information through the substrate SUB1, wherein the visibility control device 500 may prevent the other person EYE2a or persons from observing the displayed information INFO1.

Referring back to FIG. 1, the device 500 may be arranged to operate e.g. as a window panel of a room, building, cabinet or vehicle.

Optical power of one or more light sources LED1 of the device 500 may be adjusted according to ambient illumination level in the first region ZONE1 and/or according to ambient illumination level in the second region ZONE2. For example, the intensity of the protective light B2 may be increased when interior lighting in the first region ZONE1 is switched on. For example, the intensity of the protective light B2 may be reduced when the interior lighting in the first region ZONE1 is switched off. For example, the intensity of the protective light B2 may be increased in the evening when the illumination level outside in the second region ZONE2 is low.

Figure 13:
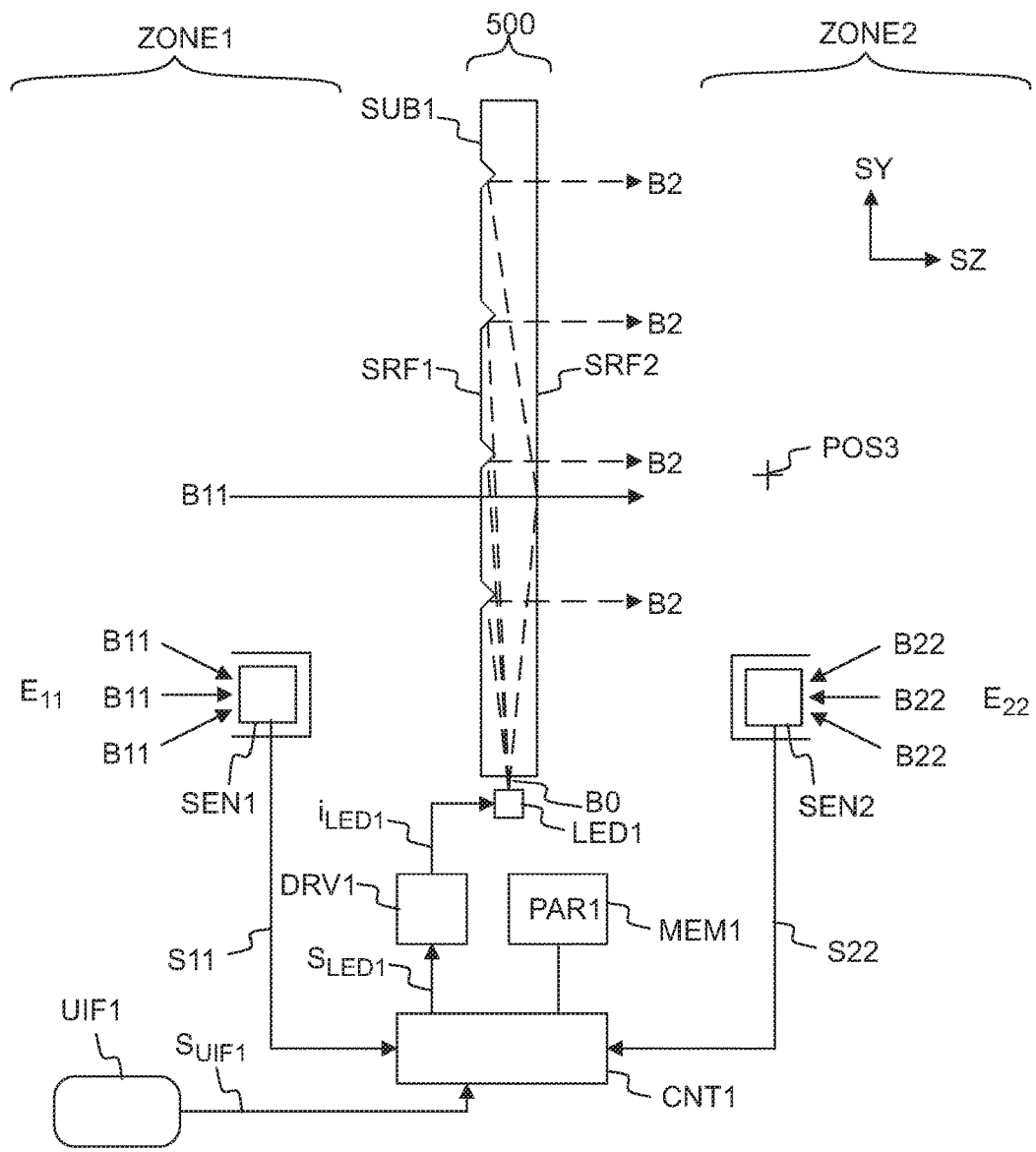
FIG. 13 shows, by way of example, a visibility control device, which comprises a first sensor to detect illumination in the first viewing region, and a second sensor to detect illumination in the second viewing region.

Referring to FIG. 13, the device 500 may optionally comprise a sensor SEN1 for measuring illumination level $E_{11}$ in the first region ZONE1. The device 500 may optionally comprise a sensor SEN2 for measuring illumination level $E_{22}$ in the second region ZONE2. The device 500 may be arranged to control the intensity of the projected deflected light B2 according to the measured illumination level in the first region ZONE1 and/or according to the measured illumination level in the second region ZONE2. The first sensor SEN1 may provide a first illumination level signal S11 by selectively detecting irradiance in the first region ZONE1, by rejecting light, which comes from outside (ZONE2). The second sensor SEN2 may provide a second illumination level signal S22 by selectively detecting irradiance in the second region ZONE2, by rejecting light, which comes from the substrate SUB1, and by rejecting light which comes from the inside (ZONE1). The signal S11 of the first sensor SEN1 may be indicative of the illumination level $E_{11}$ in the first region ZONE1. The signal S22 of the second sensor SEN2 may be indicative of the illumination level $E_{22}$ in the second region ZONE2. The device 500 may comprise a control unit CNT1, which may be configured to adjust the operating power of one or more light sources LED1 according to the detected illumination level $E_{11}$ and/or $E_{22}$. The device 500 may comprise a control unit CNT1, which may be configured to adjust the operating power of one or more light sources LED1 according to the signals S11, S22. The device 500 may comprise a driving unit DRV1 to provide one or more operating currents $i_{LED1}$ for one or more light sources LED1 according to a control signal $S_{LED1}$ provided by the control unit CNT1.

The device 500 may comprise a memory MEM1 for storing one or more operating parameters PAR1. The control unit CNT1 may be configured to adjust the operating power of one or more light sources LED1 according to the signals S11, S22. The control unit CNT1 may be configured to adjust the operating power of one or more light sources LED1 according to a control function $I_{B2}(S11,S22)$, which is defined by the operating parameters PAR1.

The device 500 may optionally comprise a user interface UIF1 to receive user input from a user, e.g. from the person EYE1. The user interface UIF1 may form one or more control signals $S_{UIF1}$ based on the received user input. The control unit CNT1 may control power of one or more light sources LED1 based on the received user input. The control unit CNT1 may control power of one or more light sources LED1 based on the control signal $S_{UIF1}$. The control unit CNT1 may e.g. switch light sources LED1a, LED1b on and off according to the received user input. The user interface UIF1 may comprise e.g. one or more manual switches to receive user input. The user interface UIF1 may comprise e.g. a touch screen for receiving user input. The user interface UIF1 may be implemented e.g. by running an application on a smartphone, and transmitting a control signal $S_{UIF1}$ to the control unit CNT1 e.g. via a wireless communication network. The user interface UIF1 may comprise e.g. a microphone for receiving user input by voice commands.

One or more parameters of the control system of the device 500 may be selected e.g. by temporarily using an auxiliary sensor for detecting the intensity $I_{B11}$ of light B11 transmitted from the inner region ZONE1 to the outer region ZONE2 through the substrate SUB1. The intensity $I_{B2}$ of the projected deflected light B2 may be selected e.g. such that intensity $I_{B2}$ of the projected deflected light B2 is greater than or equal to the intensity $I_{B11}$ of the light B11 transmitted from the inner region ZONE1 to the outer region ZONE2 through the substrate SUB1. The intensity values $I_{B2}$, $I_{B11}$ may be measured at the same location (POS3). An auxiliary sensor may be temporarily positioned e.g. to the location POS3. The intensity values $I_{B2}$, $I_{B11}$ may be measured at the same location (POS3), which may be e.g. at a distance of 1 m from the substrate SUB1 (in the region ZONE2).

Figure 14:
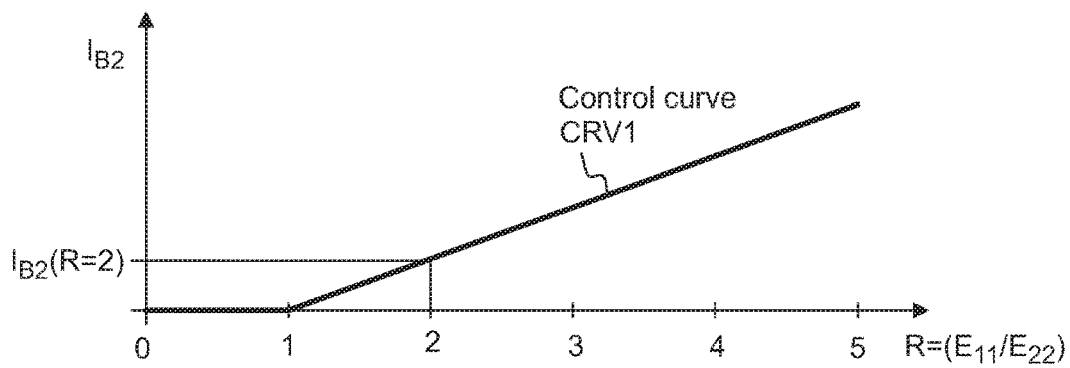
FIG. 14 shows, by way of example, a control curve for adjusting intensity of the projected deflected light according to detected illumination levels.

FIG. 14 shows, by way of example, a control curve CRV1 for adjusting optical power of one or more light sources LED1 of the device 500 according to the ratio R of the illumination level $E_{11}$ to the illumination level $E_{22}$. $R = E_{11}/E_{22}$.

The intensity $I_{B2}$ of deflected light B2 may be adjusted according to the control function $I_{B2}(E_{11}, E_{22})$. The light sources LED1 may be switched on e.g. when the ratio R increases so that the illumination level $E_{11}$ inside is greater than the illumination level $E_{22}$ outside. The power of the light sources LED1 may be increased with increasing ratio R. The light sources LED1 may be switched off when the ratio R decreases so that the illumination level $E_{11}$ is smaller than the illumination level $E_{22}$. Projecting of the deflected light B2 may be disabled when the illumination level $E_{22}$ is greater than the illumination level $E_{11}$.

Projecting of the deflected light B2 may be enabled e.g. when the detected illumination level $E_{22}$ in the second (outer) region ZONE2 is smaller than the detected illumination level $E_{11}$ in the first (inner) region ZONE1.

The intensity of deflected light $I_{B2}$ may be adjusted e.g. according to the control function (1a) or (1b):

$$I_{B2}(E_{11}, E_{22}) = I_{B2,REF} \cdot k_1 \frac{(E_{11} - k_2 \cdot E_{22})}{E_{22}} \quad (1a)$$

$I_{B2,REF}$ denotes a reference value of the intensity of the deflected light B2. $E_{11}$ denotes detected illumination level in the first (inner) region ZONE1. $E_{22}$ denotes detected illumination level in the second (outer) region ZONE2. $k_1$ and $k_2$ may be selectable constants. For example, the constant $k_1$ may be greater than or equal to one. For example, the constant $k_2$ may be smaller than or equal to one. The reference value $I_{B2,REF}$ may be selected e.g. such that the projected intensity $I_{B2}$ is greater than or equal to the transmitted intensity $I_{B11}$, in a situation where the illumination level $E_{22}$ is zero.

The signal value $S_{11}$ of the sensor SEN1 may be proportional to the illumination level $E_{11}$. The signal value $S_{22}$ of the sensor SEN2 may be proportional to the illumination level $E_{22}$. In practice, the sensors SEN1, SEN2 do not need to provide calibrated irradiance values ($E_{11}$, $E_{22}$). The intensity of deflected light $I_{B2}$ may be adjusted based on signals S11, S22 of the sensors SEN1, SEN2 e.g. according to the following control function (1b):

$$I_{B2}(S_{11}, S_{22}) = I_{B2,REF} \cdot k_1 \frac{(S_{11} - k_2 \cdot S_{22})}{S_{22}} \quad (1b)$$

One or more parameters $I_{B2,REF}$, $k_1$, $k_2$ of the control function $I_{B2}(S_{11}, S_{22})$ may be stored as parameters PAR1 in a memory MEM1 of the device 500.

Adjusting the intensity $I_{B2}$ according to the detected illumination levels E11, E22 may e.g. reduce consumption of electric power needed for driving the light sources LED1.

Projecting of the deflected light B2 may be disabled when the intensity value determined from the equation (1) is negative. For example, projecting of the deflected light B2 may be disabled when the illumination level $E_{22}$ is greater than the illumination level $E_{11}$.

The control unit CNT1 may also be configured to exhibit hysteresis so as to reduce or avoid flickering of the deflected light B2, in a situation where at least one of the illumination levels $E_{11}$, $E_{22}$ is varying.

In an embodiment, the light sources LED1 of the device 500 may be arranged to operate continuously, so as to provide continuous protection of privacy of the first region ZONE1.

In an embodiment, the one or more light sources LED1 of the device 500 may be switched on and off in order to enable and disable the protective light B2.

In an embodiment, the device 500 may comprise a user interface (UIF1) for receiving user input e.g. from the observer EYE1. The user interface may comprise e.g. manual keys and/or a touch screen for receiving user input. The device 500 may be arranged to control the intensity of the deflected light B2 according to the received user input.

In an embodiment, the emission of the dazzling light may be switched off, e.g. in order to temporarily allow two-directional visibility, if desired.

In an embodiment, visibility control device 500 may optionally comprise a photochromic film, or an electrochromic film for controlling optical transmittance of the device 500 e.g. instead or in addition to mirror layer M1.

In an embodiment, the device 500 may be used as a window of a room or building, which is used e.g. as a border control facility, customs facility, police facility, medical facility, postal facility, or banking facility. The device 500 may prevent outsiders from observing what is happening inside.

In an embodiment, the device 500 may be used e.g. as a controllable window of a store or a cabinet. For example, the store or the cabinet may comprise products, which are positioned behind the substrate SUB1 of the device 500 so that customers located outside may see the products through the transparent substrate SUB1 during a first period of time, when projection of the deflected light B2 has been switched off. Projection of the deflected light B2 may be switched on to prevent observing the products during a second period of time. Projecting of the deflected light B2 may be enabled during the second time period e.g. in order to protect the privacy of a customer who is entering the store. Projecting of the deflected light B2 may be enabled during the second time period e.g. in order to use the device 500 or another display for displaying information (e.g. to display a commercial advertisement). Projecting of the deflected light B2 may be enabled during the second time period e.g. in order to divert the attention of the customers (who are located outside) to another object instead of the interior of the store or the cabinet. Projecting of the deflected light B2 may be enabled during the second time period e.g. in order to indicate that the store is temporarily closed.

In an embodiment, the device 500 may be used e.g. as a controllable window of a room. The room may be e.g. dressing room, a fitting room, or a shower room. Projecting of the deflected light B2 may be disabled during a first time period e.g. in order to indicate that the room is available for use. Projecting of the deflected light B2 may be enabled during a second time period e.g. in order to indicate that the fitting room is occupied and/or reserved. Projecting of the deflected light B2 may be enabled during the second time period e.g. in order to protect the privacy of a person who is located inside the fitting room.

In an embodiment, the visibility control device 500 may also be arranged to illuminate one or more objects OBJ2 located in the region ZONE2, by using the deflected light B2. For example, the visibility control device 500 may be simultaneously used as a window of a building, and as a luminaire for illuminating e.g. a walkway outside the building.

In an embodiment, a first person may wear an augmented reality display in front of his eye to view displayed images or video. The augmented reality display may be partly transparent so that the first person may simultaneously observe the displayed (virtual) image and the real environment. For example, the first person may observe a product in a store through the augmented reality display, and the first person may simultaneously see a virtual image displayed on the augmented reality display. The augmented reality display may be configured to display a virtual image, which represents e.g. price information or technical information related to the product. The displayed virtual image may sometimes be visible also from the other side of the augmented reality display.

The visibility control device 500 may be combined with the augmented reality display, wherein the visibility control device 500 may be arranged to prevent other persons from viewing the displayed virtual image.

Figure 15:
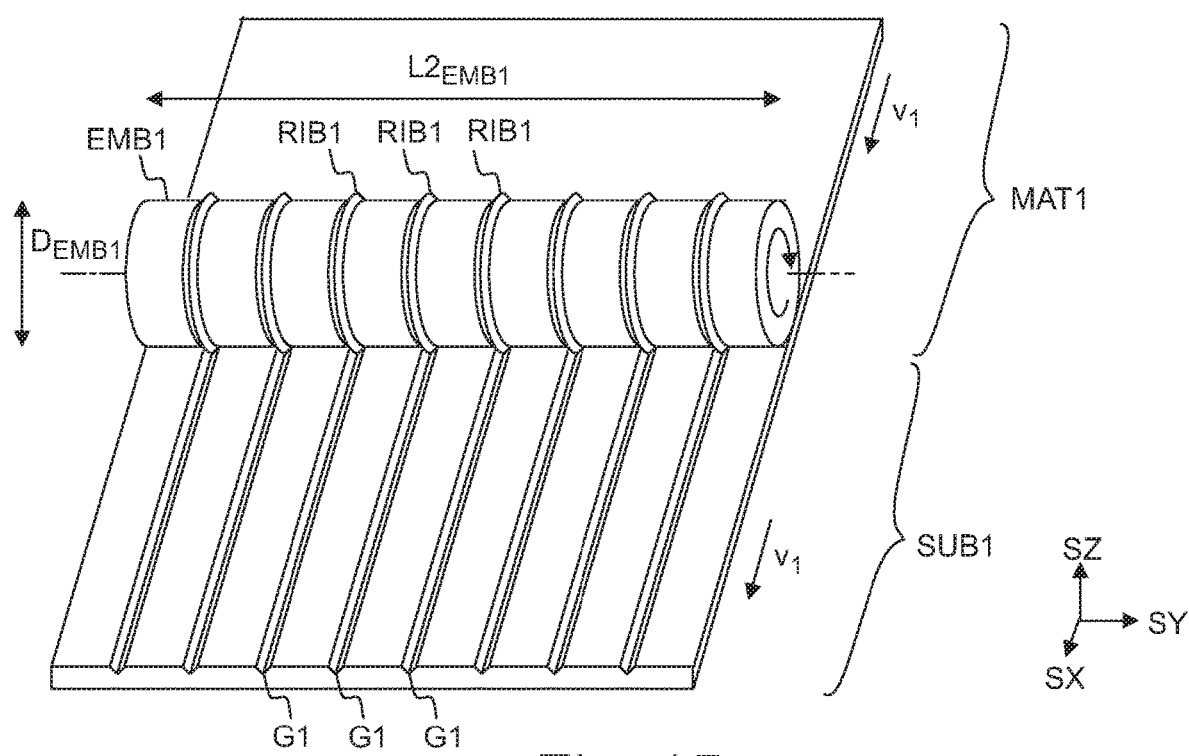
FIG. 15 shows by way of example, in a three-dimensional view, forming the grooves by embossing.

Referring to FIG. 15, the substrate SUB1 may be produced e.g. by embossing on a material MAT1. An embossing tool EMB1 may comprise microscopic protrusions RIB1, which may form the grooves G1 on the substrate SUB1, when pressed against the material MAT1 of the substrate. The grooves G1 may be formed e.g. by using a rotating embossing roll EMB1, which may be pressed against the material MAT1. The material MAT1 and the substrate SUB1 may move at a velocity vi with respect to the embossing tool EMB1. The rotating embossing tool EMB1 may allow producing the substrate SUB1 with a roll-to-roll process.

Forming the grooves G1 by embossing may facilitate mass production of a large quantity of substrates SUB1. Forming the grooves G1 by embossing may facilitate producing a substrate SUB1 which has a large surface area. Forming the grooves G1 by embossing may facilitate producing a substrate SUB1, which has a large width and/or length ($L1_{SUB1}$, $L2_{SUB1}$).

The grooves G1 may be formed by hot embossing, wherein the embossing tool EMB1 and/or the material MAT1 may be heated above a glass transition temperature of the material MAT1. The shape of the grooves G1 may be subsequently stabilized by cooling the material MAT1.

The shape of the grooves G1 may also be stabilized e.g. by curing UV-curable material MAT1 with ultraviolet radiation. UV means ultraviolet radiation.

The embossing tool EMB1 may be formed e.g. by mechanical machining. In particular, the embossing tool EMB1 may be formed by mechanical machining by using a lathe. The protrusions RIB1 may be formed e.g. by cutting with a diamond edge. Forming the embossing tool EMB1 in the lathe may facilitate producing an embossing roll EMB1, which has a large dimension $D_{EMB1}$ and/or a large dimension $L2_{EMB1}$. The symbol $D_{EMB1}$ may denote the diameter of the embossing roll EMB1. The symbol $L2_{EMB1}$ may denote the length of the embossing roll EMB1.

A groove G1 of the substrate SUB1 may have e.g. substantially uniform width $w_{G1}$ and/or substantially uniform depth $h_{G1}$. The groove G1 may have e.g. substantially rectangular shape when viewed in the direction (SZ), which is perpendicular to the first major surface SRF1. The grooves G1 of the substrate SUB1 may have the same width $w_{G1}$ or different widths $w_{G1}$. The grooves G1 of the substrate SUB1 may have the same depth $h_{G1}$ or different depths $h_{G1}$.

Figure 16A:
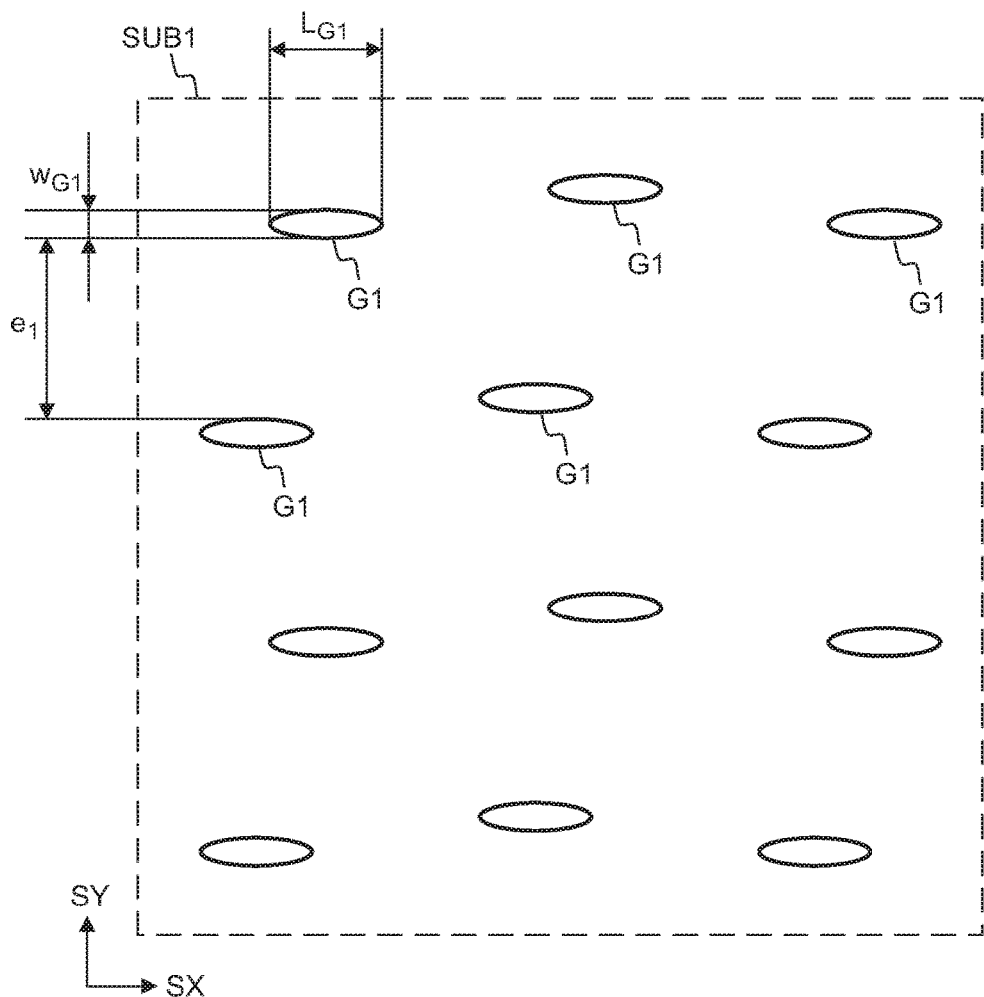
FIG. 16a shows, by way of example, in a front view, a substrate which comprises short grooves.
Figure 16B:
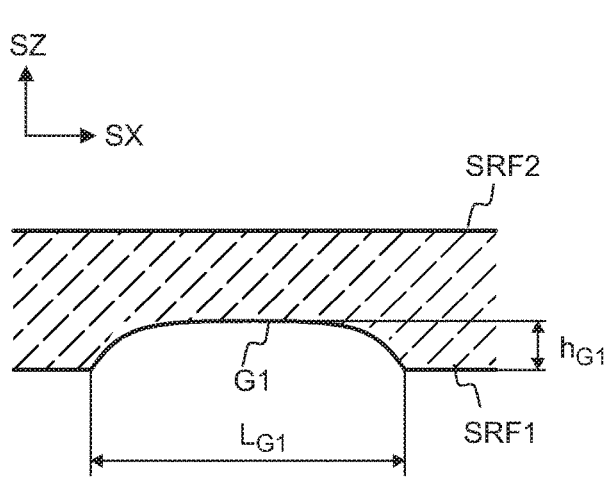
FIG. 16b shows, by way of example, in a cross-sectional view, a groove which has non-uniform depth.

Referring to FIGS. 16a and 16b, the grooves G1 of the substrate SUB1 may also have non-uniform width $w_{G1}$ and/or non-uniform depth $h_{G1}$. A groove G1 may have e.g. substantially elliptical shape when viewed in the direction (SZ), which is perpendicular to the first major surface SRF1.

The ratio ($L_{G1}/w_{G1}$) of the length $L_{G1}$ of a groove G1 to the width $w_{G1}$ of the groove G1 may be e.g. greater than 2.0 in order to provide directional light-deflecting properties. The ratio ($L_{G1}/w_{G1}$) may be e.g. greater than 2.0, greater than 5.0, or even greater than 10.0.

Figure 16C:
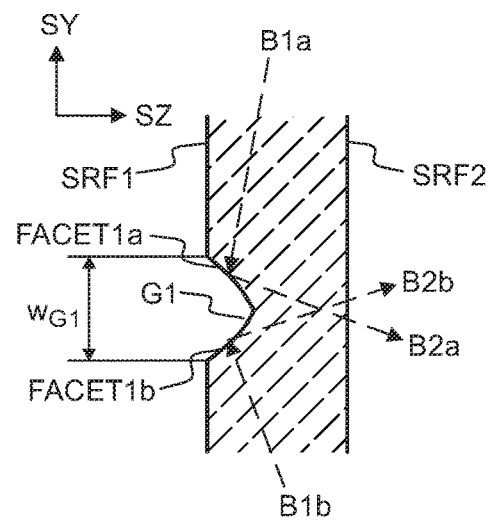
FIG. 16c shows, by way of example, in a cross-sectional view, a groove which has curved light-deflecting facets.

The facets FACET1a, FACET1b of a groove G1 may be flat or curved. FIG. 16c shows, by way of example, a groove G1 which has curved facets.

Figure 17:
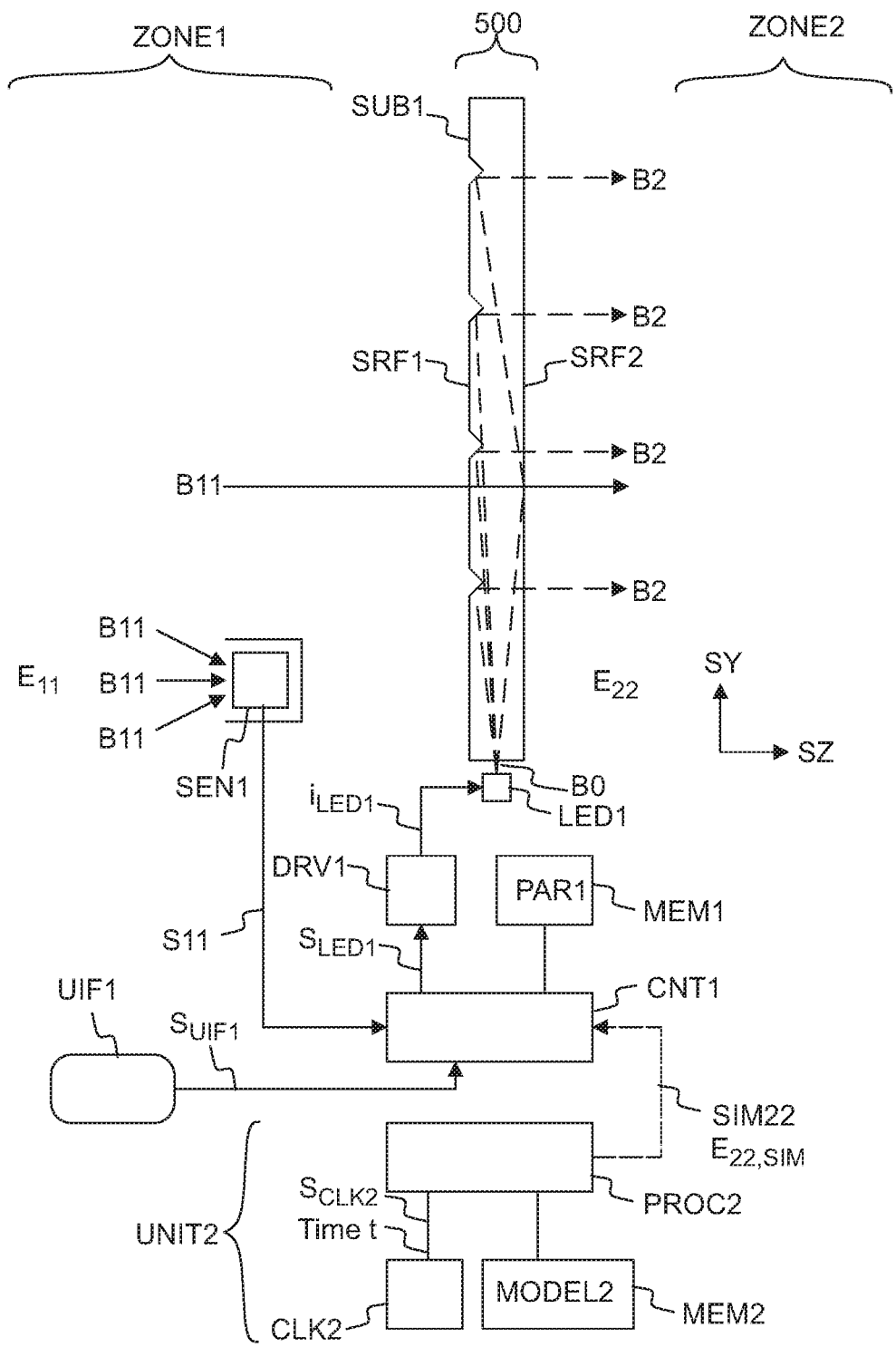
FIG. 17 shows, by way of example, a visibility control device, which comprises a first sensor to detect illumination in the first viewing region, and an estimating unit to estimate illumination in the second viewing region.

Referring to FIG. 17, the illumination level sensor SEN2 may also be replaced with an estimation unit UNIT2. The estimation unit UNIT2 may be arranged to form a signal SIM22 indicative of an estimated illumination level $E_{22,SIM}$ in the second region ZONE2. The actual illumination level $E_{22}$ in the second region ZONE2 may exhibit diurnal and seasonal variation. The estimated illumination level $E_{22,SIM}$ may be an estimate of the actual illumination level $E_{22}$. The estimated illumination level $E_{22,SIM}$ may also be called as a simulated illumination level. The estimation unit UNIT2 may also be called as a simulation unit.

The estimation unit UNIT2 may determine the estimated illumination level $E_{22,SIM}$ as a function of time t by using a model MODEL2. The model MODEL2 may comprise data for calculating the estimated illumination level $E_{22,SIM}$ as a function of the time t. The model MODEL2 may comprise e.g. one or more regression functions for determining the estimated illumination level $E_{22,SIM}$ as a function of the time t. The estimated illumination level $E_{22,SIM}$ during daylight hours of a single day may be approximated e.g. by a section of a sinusoidal curve.

The estimation unit UNIT2 may provide a time signal $S_{CLK2}$, which indicates the real time t. The real time t may include information about the time within a day, and the date of said day. The time signal $S_{CLK2}$ may specify the time and date. Consequently, the estimation unit UNIT2 may determine the estimated illumination level $E_{22,SIM}$ by using the time signal $S_{CLK2}$, so as to take into account the estimated diurnal and seasonal variation of the illumination level $E_{22}$. The estimation unit UNIT2 may determine the estimated illumination level $E_{22,SIM}$ as a function of the time t by using the model MODEL2. The model MODEL2 may take into account estimated diurnal and seasonal variation of the actual illumination level $E_{22}$ in the second region ZONE2.

The device 500 may be arranged to control the intensity of the projected deflected light B2 according to the measured illumination level in the first region ZONE1 and according to the estimated illumination level $E_{22,SIM}$ in the second region ZONE2. The control unit CNT1 may be configured to adjust the operating power of one or more light sources LED1 according to the detected illumination level $E_{11}$ and according to the estimated illumination level $E_{22,SIM}$. The control unit CNT1 may be configured to adjust the operating power of one or more light sources LED1 according to the signals S11 and SIM22.

The measured intensity $E_{22}$ in equation (1a) may be replaced with the estimated intensity $E_{22,SIM}$ in the equation (1a).

The signal SIM22 may be proportional to the estimated intensity $E_{22,SIM}$. The signal S22 may be replaced with the signal SIM22 in the equation (1b).

The estimation unit UNIT2 may comprise a clock CLK2 for providing the time signal $S_{CLK2}$. The estimation unit UNIT2 may also obtain a time signal $S_{CLK2}$ e.g. via a mobile communication network, via the Internet and/or from navigation satellites (e.g. GPS, GLONASS, Beidou).

The estimation unit UNIT2 may comprise a memory MEM2 for storing the model MODEL2. The estimation unit UNIT2 may comprise a memory MEM2 for storing data of the model MODEL2. The estimation unit UNIT2 may comprise one or more data processors PROC2 for determining the estimated illumination level $E_{22,SIM}$ according to the time t by using the model MODEL2. The estimation unit UNIT2 may be implemented e.g. by running computer program code on one or more data processors (PROC2). The estimation unit UNIT2 may be implemented e.g. by running computer program code on one or more data processors of the control unit CNT1. The clock signal $S_{CLK2}$ may be obtained e.g. from the Internet and/or from a clock CLK2 of a computer.

Figure 18A:
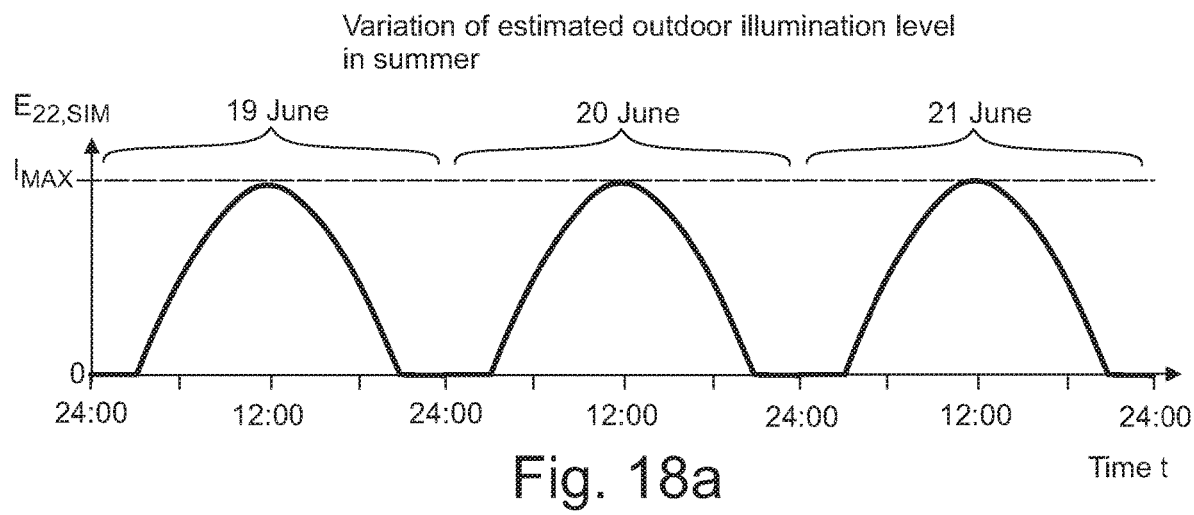
FIG. 18a shows, by way of example, diurnal variation of estimated illumination level in summer.
Figure 18B:
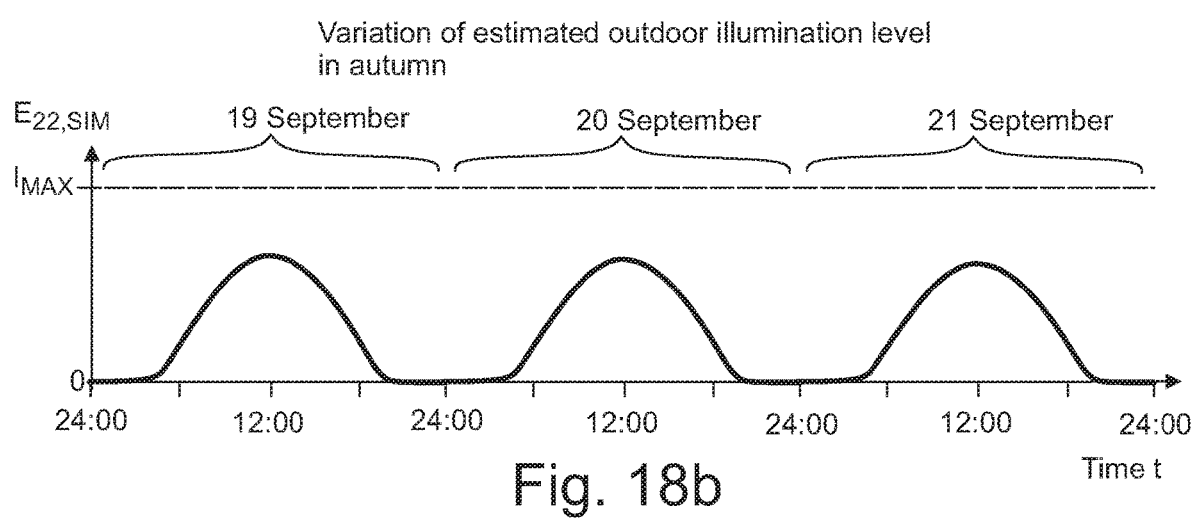
FIG. 18b shows, by way of example, diurnal variation of estimated illumination level in autumn.
Figure 18C:
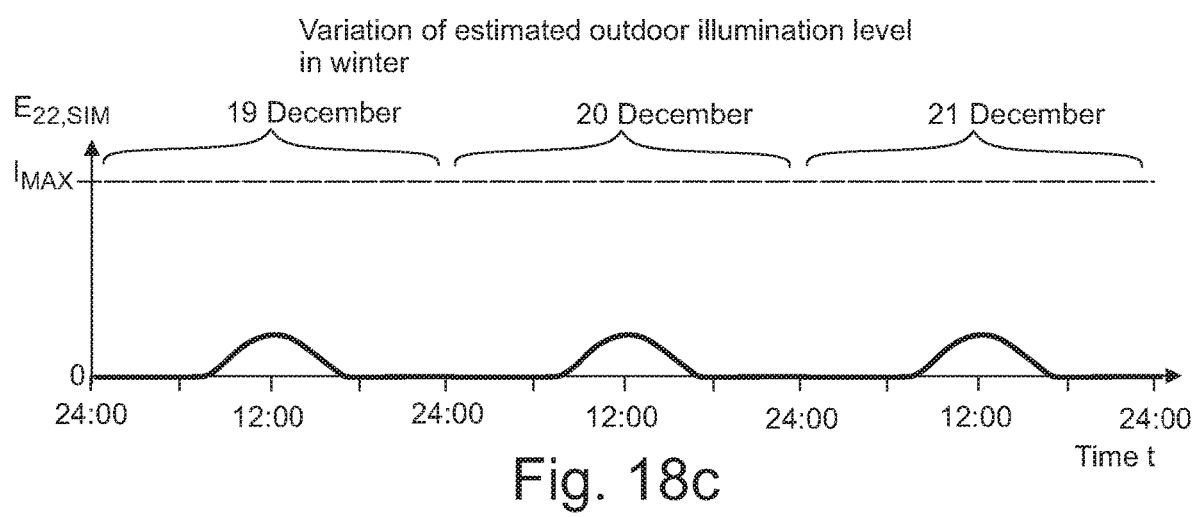
FIG. 18c shows, by way of example, diurnal variation of estimated illumination level in winter.

FIGS. 18a to 18c show, by way of example, diurnal and seasonal variation of the estimated illumination level $E_{22,SIM}$. The daily maximum intensity may be reached at the time 12:00 (ignoring daylight saving, if any). The intensity may be substantially equal to zero in the night, e.g. at the time 24:00. The daily maximum intensity may be higher in the summer than in the winter. $I_{MAX}$ denotes the maximum intensity during the summer solstice. The estimation unit UNIT2 may be arranged to provide the estimated illumination level $E_{22,SIM}$ as a function of time. The estimation unit UNIT2 may be arranged to provide the estimated illumination level $E_{22,SIM}$ e.g. as shown in FIGS. 18a to 18c.

The model MODEL2 may be determined e.g. by using an illumination sensor to measure the illumination level $E_{22}$ in the second region ZONE2, and by determining one or more parameters of the model MODEL2 based on the measured illumination data. The model MODEL2 may be trained by using measured illumination data obtained from an external illumination sensor (e.g. SEN2). The model MODEL2 may be determined to include e.g. the effects of daylight, streetlight, urban lighting, and/or moonlight. It is not necessary to use the external illumination sensor when estimating the illumination level $E_{22}$ in the second region ZONE2, after the model MODEL2 has been determined.

The model MODEL2 may also be determined by using historical illumination data. Historical illumination data may be obtained e.g. from an Internet server. The model MODEL2 may also be determined based on astronomical calculations about daily solar radiation at a predetermined geographical location. The diurnal and seasonal variation of incoming solar radiation may be different in Helsinki and in Rome. The model MODEL2 may be specific to the geographical location of the visibility control device (500).

The visibility control device 500 may comprise a first sensor SEN1 for measuring illumination level $E_{11}$ in the first region ZONE1, wherein the device 500 may be arranged to control the intensity of the deflected light B2 according to the measured illumination level $E_{11}$ in the first region ZONE1, and according to a measured illumination level $E_{22}$ or according to an estimated illumination level $E_{22,SIM}$ in the second region ZONE2.

The control function $I_{B2}(E_{11}, E_{22})$ for controlling the intensity $I_{B2}$ as the function of the illumination levels $E_{11}$, $E_{22}$ may be determined according to one or more optimization criteria. For example, the control function may be determined to ensure a high degree of privacy (only) in one or more predetermined combinations of illumination levels $(E_{11}, E_{22})$, wherein the control function may provide a lower degree of privacy in other illumination conditions. For example, the optimization criteria may include e.g. minimizing electric power of the light sources LED1, ensuring a high degree of privacy in one or more predetermined combinations of illumination levels $(E_{11}, E_{22})$, or ensuring a high degree of privacy in all possible combinations of illumination conditions. The control function may be e.g. a linear function, a polynomial function, an exponential function, or a logarithmic function.

For example, the projected intensity $I_{B2}$ may be controlled e.g. according to a linear function of the illumination levels $E_{11}$, $E_{22}$. The visibility control device 500 may be arranged to control the intensity $I_{B2}$ of deflected light e.g. according to the control function (2a) or (2b):

$$I_{B2}(E_{11},E_{22})=I_{B2,REF}\cdot(k_{11}\cdot E_{11}-k_{22}\cdot E_{22}+k_3) \qquad (2a)$$

$$I_{B2}(S_{11},S_{22})=I_{B2,REF}\cdot(k_{11}\cdot S_{11}-k_{22}\cdot S_{22}+k_3) \qquad (2b)$$

$I_{B2,REF}$ denotes a reference value of the intensity of the deflected light B2. $E_{11}$ denotes detected illumination level in the first (inner) region ZONE1. E22 denotes detected illumination level in the second (outer) region ZONE2. $k_{11}$, $k_{22}$ and $k_3$ may be selectable constants. The reference value $I_{B2,REF}$ may be selected e.g. such that the projected intensity $I_{B2}$ is greater than or equal to the transmitted intensity $I_{B11}$, in a situation where the illumination level $E_{22}$ is zero. The measured intensity $E_{22}$ in equation (2a) may also be replaced with the estimated intensity $E_{22,SIM}$ in the equation (2a). The signal SIM22 may be proportional to the estimated intensity $E_{22,SIM}$. The signal S22 may be replaced with the signal SIM22 in the equation (2b). Projecting of the deflected light B2 may be disabled when the intensity value determined from the control function is negative.

In an embodiment, the estimated illumination level $E_{22,SIM}$ may also be constant, i.e. the estimated illumination level $E_{22,SIM}$ does not vary as a function of time t. In particular, the estimated illumination level $E_{22,SIM}$ may be equal to zero. In that case the visibility control device 500 does not need to comprise the illumination sensor SEN2 and/or the visibility control device 500 does not need to comprise the estimation unit UNIT2.

The visibility control device 500 may comprises a first sensor SEN1 for measuring illumination level $(E_{11})$ in the first region ZONE1, wherein the device 500 may be arranged to control the intensity of the deflected light B2 according to the measured illumination level $E_{11}$ in the first region ZONE1.

The visibility control device 500 may be arranged to control the intensity of deflected light $I_{B2}$ e.g. according to the control function (3a) or (3b):

$$I_{B2}(E_{11})=I_{B2,REF}\cdot(k_{11}\cdot E_{11}+k_3) \qquad (3a)$$

$$I_{B2}(S_{11})=I_{B2,REF}\cdot(k_{11}\cdot S_{11}+k_3) \qquad (3b)$$

For the person skilled in the art, it will be clear that modifications and variations of the systems, products, devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. A method for controlling visibility by using a visibility control device, the visibility control device comprising:
   one or more light sources to provide input light, and
   a waveguiding substrate, which has a first major surface and a second major surface,
   wherein an out-coupling region of the substrate comprises a plurality of grooves implemented on the first major surface and/or on the second major surface,
   wherein the device is arranged to form guided light by coupling the input light into the substrate,
   wherein the grooves are arranged to form deflected light by coupling the guided light out of the substrate through the second major surface of the substrate,
   wherein the device has a first viewing region at a first side of the device, and a second viewing region at a second side of the device, wherein the device is arranged to provide the deflected light such that the deflected light prevents a second observer from viewing from the second viewing region to the first viewing region, wherein the device at the same time allows a first observer located in the first viewing region to view from the first viewing region to the second viewing region through the device,
   wherein the device comprises a first sensor for measuring illumination level in the first viewing region,
   wherein the device comprises a second sensor for measuring illumination level in the second viewing region,
   and wherein the device is arranged to control the intensity of the deflected light according to the measured illumination level in the first viewing region and according to the measured illumination level in the second viewing region,
   the method comprising:
      placing an auxiliary sensor to a measurement position in the second viewing region,
      selecting one or more parameters of a control system of the device by using the auxiliary sensor at said measurement position for detecting an intensity of object light transmitted from the first viewing region to the second viewing region through the substrate, and
      using the visibility control device to project the deflected light to the second viewing region,
      wherein the object light is received from an object located in the first viewing region, and
      wherein the intensity of the projected deflected light is selected to be greater than or equal to the intensity of the object light transmitted from the first viewing region to the second viewing region through the substrate.

2. The method of claim 1, wherein the first sensor is arranged to provide a first illumination level signal by selectively detecting irradiance in the first viewing region, by rejecting light, which comes from the second viewing region.

3. The method according to claim 1, wherein an area covered by the grooves within the out-coupling region of the substrate is selected to be smaller than 5% of the area of the out-coupling region such that average optical attenuation in the out-coupling region is smaller than 20% for visible light, which is transmitted through the substrate in a direction, which is perpendicular to the first major surface, wherein the average optical attenuation is the average value of optical attenuation over the out-coupling region.

4. The method according to claim 1, wherein the width of the grooves is in the range of 1 μm to 10 μm, and wherein the depth of the grooves is in the range of 0.5 μm to 5 μm.

5. The method according to claim 1, wherein the width of the grooves is in the range of 1 μm to 7 μm.

6. The method according to claim 1, wherein an average distance between adjacent grooves is smaller than 0.6 mm within the out-coupling region.

7. The method according to claim 1, wherein the first major surface comprises light-deflecting grooves, which have reflective facets.

8. The method according to claim 1, wherein the second major surface comprises light-deflecting grooves, which have refractive facets.

9. The method according to claim 1, wherein the substrate comprises a first out-coupling region and a second out-coupling region, wherein the out-coupling properties of the first out-coupling region are different from the out-coupling properties of the second out-coupling region, and wherein a boundary between the first out-coupling region and the second out-coupling region represents a graphical pattern.

10. The method according to claim 1, wherein the substrate is a curved waveguide.

11. The method according to claim 1, wherein at least one major surface of the substrate is arranged to provide total internal reflection of the guided light by operating as a solid-gas interface.

12. The method of claim 1, comprising changing intensity of the projected deflected light by controlling operation of at least one of the light sources.

13. The method according to claim 1, comprising adjusting the intensity $I_{B2}$ of the deflected light as a function of illumination levels $E_{11}$ and $E_{22}$ according to an equation $$I_{B2}=I_{B2,REF} \cdot (k_{11} \cdot E_{11} - k_{22} \cdot E_{22} + k_3)$$

where $I_{B2,REF}$ denotes a reference value of the intensity of the deflected light, $E_{11}$ denotes measured illumination level in the first viewing region, $E_{22}$ denotes a measured or estimated illumination level in the second viewing region, wherein $k_{11}$, $k_{22}$, $k_3$ are selectable constants.

14. The method according to claim 1, comprising using the device as a controllable privacy screen.

15. The method according to claim 1, comprising using the device as a window of a building, as a window of a room, or as a window of a vehicle.

16. The method according to claim 1, comprising using the device to prevent visibility of information displayed on a display.

17. The method of claim 2, wherein the second sensor is arranged to provide a second illumination level signal by selectively detecting irradiance in the second viewing region, by rejecting light, which comes from the substrate, and by rejecting light which comes from the first viewing region.

18. The method according to claim 13, wherein the reference value is selected such that the intensity of the projected deflected light is greater than or equal to the intensity of the object light in a situation where the illumination level in the second viewing region is zero.

* * * * *